United States Patent
Igarashi et al.

(10) Patent No.: US 6,674,912 B2
(45) Date of Patent: Jan. 6, 2004

(54) DATA COMPRESSION PROCESSING METHOD AND APPARATUS

(75) Inventors: Isao Igarashi, Maebashi (JP); Tsuyahiko Shimada, Maebashi (JP); Yoshiharu Shimada, Maebashi (JP)

(73) Assignee: Fujitsu Limited, Kawasaki (JP)

( * ) Notice: Subject to any disclaimer, the term of this patent is extended or adjusted under 35 U.S.C. 154(b) by 587 days.

(21) Appl. No.: 09/740,996

(22) Filed: Dec. 21, 2000

(65) Prior Publication Data

US 2001/0031080 A1 Oct. 18, 2001

(30) Foreign Application Priority Data

Apr. 12, 2000 (JP) .................................... 2000-110760

(51) Int. Cl.[7] .............................. G06K 9/36; G06K 9/46
(52) U.S. Cl. ...................... 382/244; 382/245; 382/246; 382/247; 358/426.01; 358/426.13
(58) Field of Search ................................. 382/232, 244, 382/245, 246, 247; 358/426.01, 426.02, 426.13, 426.14, 426.15, 426.16, 3.23, 448

(56) References Cited

U.S. PATENT DOCUMENTS

| | | | | |
|---|---|---|---|---|
| 5,067,023 A | * | 11/1991 | Kim | 382/166 |
| 5,204,756 A | * | 4/1993 | Chevion et al. | 382/239 |
| 5,610,727 A | * | 3/1997 | Kamioka | 358/448 |

FOREIGN PATENT DOCUMENTS

| | | |
|---|---|---|
| JP | 59-58971 | 4/1984 |
| JP | 61-224731 | 10/1986 |
| JP | 5-260322 | 10/1993 |
| JP | 7-322077 | 12/1995 |

* cited by examiner

Primary Examiner—Bhavesh M. Mehta
Assistant Examiner—Ali Bayat
(74) Attorney, Agent, or Firm—Arent Fox Kintner Plotkin & Kahn PLLC

(57) ABSTRACT

The present invention provides a high speed MMR compression processing method by reducing the number of times of repeating a process of finding the positions of changing pixels $a_1$, $a_2$, $b_1$, and $b_2$. According to this method, first, a bit string corresponding to pixel data is obtained from an image. Then, data are sequentially fetched from the bit string byte by byte. Subsequently, a search is made of a table that describes the number of consecutive bits that are arranged to the right of and have the same color as each of bits of each byte of all bit patterns represented by bits included in the fetched 1 byte. Then, the number of consecutive bits, which are arranged to the right of and have the same color as each of bits of each of the fetched bytes, is detected according to the bit patterns represented by bits of the fetched byte. Subsequently, a pixel placed at the position corresponding to the number obtained by adding 1 to the detected number of consecutive bits is determined as a color changing pixel. Then, the position of each changing pixel in each of the sequentially fetched bytes is obtained. Subsequently, the image data is coded according to the position of each of the changing pixels.

6 Claims, 17 Drawing Sheets

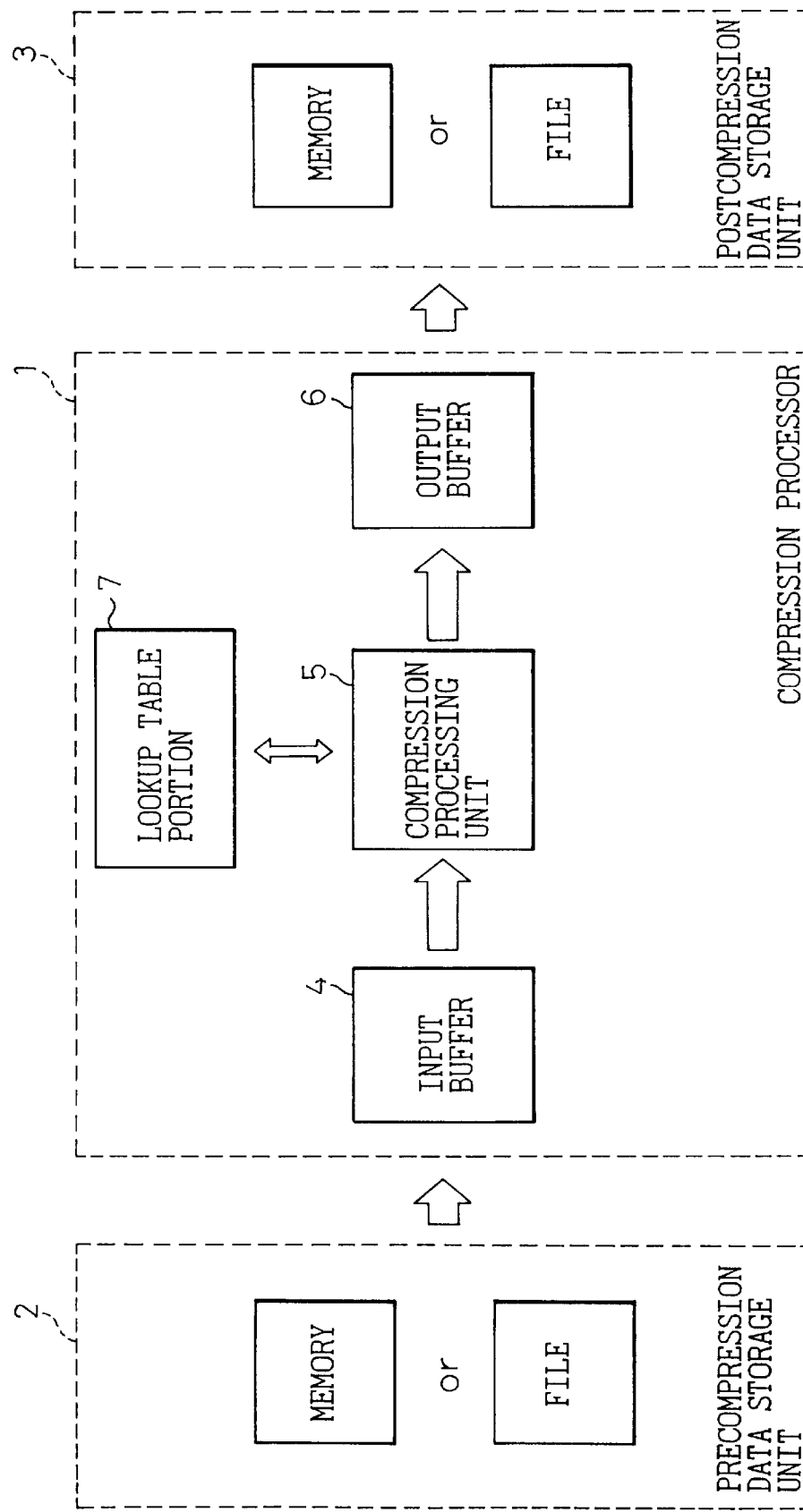

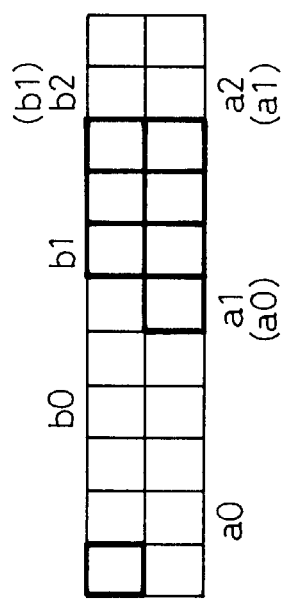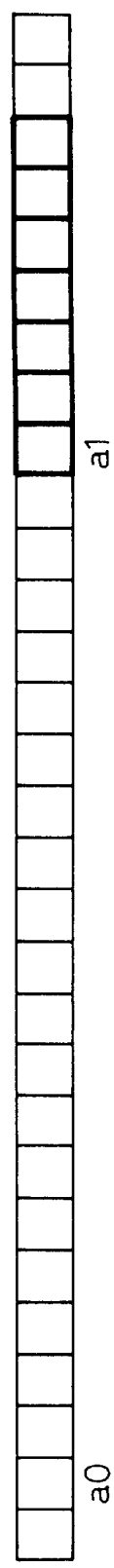

Fig.3

TABLE A

| No. | BIT PATTERN | 0 | 1 | 2 | 3 | 4 | 5 | 6 | 7 |
|---|---|---|---|---|---|---|---|---|---|
| 0 | 0 0 0 0 0 0 0 0 | 7 | 6 | 5 | 4 | 3 | 2 | 1 | 0 |
| 1 | 0 0 0 0 0 0 0 1 | 6 | 5 | 4 | 3 | 2 | 1 | 0 | 0 |
| 2 | 0 0 0 0 0 0 1 0 | 5 | 4 | 3 | 2 | 1 | 0 | 0 | 0 |
| 3 | 0 0 0 0 0 0 1 1 | 5 | 4 | 3 | 2 | 1 | 0 | 0 | 0 |
| 4 | 0 0 0 0 0 1 0 0 | 4 | 3 | 2 | 1 | 0 | 0 | 1 | 0 |
| 5 | 0 0 0 0 0 1 0 1 | 4 | 3 | 2 | 1 | 0 | 0 | 0 | 0 |
| 6 | 0 0 0 0 0 1 1 0 | 4 | 3 | 2 | 1 | 0 | 0 | 0 | 0 |
| 7 | 0 0 0 0 0 1 1 1 | 4 | 3 | 2 | 1 | 1 | 0 | 0 | 0 |
| 8 | 0 0 0 0 1 0 0 0 | 3 | 2 | 1 | 0 | 0 | 2 | 1 | 0 |
| 9 | 0 0 0 0 1 0 0 1 | 3 | 2 | 1 | 0 | 0 | 1 | 0 | 0 |
| 10 | 0 0 0 0 1 0 1 0 | 3 | 2 | 1 | 0 | 0 | 0 | 0 | 0 |
| 11 | 0 0 0 0 1 0 1 1 | 3 | 2 | 1 | 0 | 0 | 0 | 0 | 0 |
| 12 | 0 0 0 0 1 1 0 0 | 3 | 2 | 1 | 0 | 0 | 0 | 1 | 0 |
| 13 | 0 0 0 0 1 1 0 1 | 3 | 2 | 1 | 0 | 0 | 0 | 0 | 0 |
| 14 | 0 0 0 0 1 1 1 0 | 3 | 2 | 1 | 0 | 0 | 0 | 0 | 0 |
| 15 | 0 0 0 0 1 1 1 1 | 3 | 2 | 1 | 0 | 0 | 0 | 0 | 0 |
| 16 | 0 0 0 1 0 0 0 0 | 2 | 1 | 0 | 0 | 3 | 2 | 1 | 0 |
| ... | ... | ... | ... | ... | ... | ... | ... | ... | ... |
| 223 | 1 1 0 1 1 1 1 1 | 0 | 0 | 0 | 0 | 0 | 0 | 0 | 0 |
| 224 | 1 1 1 0 0 0 0 0 | 0 | 0 | 0 | 4 | 3 | 2 | 1 | 0 |
| 225 | 1 1 1 0 0 0 0 1 | 0 | 0 | 0 | 3 | 2 | 1 | 0 | 0 |
| 226 | 1 1 1 0 0 0 1 0 | 0 | 0 | 0 | 2 | 1 | 0 | 0 | 0 |
| 227 | 1 1 1 0 0 0 1 1 | 0 | 0 | 0 | 2 | 1 | 0 | 0 | 0 |
| 228 | 1 1 1 0 0 1 0 0 | 0 | 0 | 0 | 1 | 0 | 0 | 1 | 0 |
| 229 | 1 1 1 0 0 1 0 1 | 0 | 0 | 0 | 1 | 0 | 0 | 0 | 0 |
| 230 | 1 1 1 0 0 1 1 0 | 0 | 0 | 0 | 1 | 0 | 0 | 0 | 0 |
| 231 | 1 1 1 0 0 1 1 1 | 0 | 0 | 0 | 1 | 0 | 0 | 0 | 0 |
| 232 | 1 1 1 0 1 0 0 0 | 0 | 0 | 0 | 0 | 0 | 2 | 1 | 0 |
| 233 | 1 1 1 0 1 0 0 1 | 0 | 0 | 0 | 0 | 0 | 1 | 0 | 0 |
| 234 | 1 1 1 0 1 0 1 0 | 0 | 0 | 0 | 0 | 0 | 0 | 0 | 0 |
| 235 | 1 1 1 0 1 0 1 1 | 0 | 0 | 0 | 0 | 0 | 0 | 0 | 0 |
| 236 | 1 1 1 0 1 1 0 0 | 0 | 0 | 0 | 0 | 0 | 0 | 1 | 0 |
| 237 | 1 1 1 0 1 1 0 1 | 0 | 0 | 0 | 0 | 0 | 0 | 0 | 0 |
| 238 | 1 1 1 0 1 1 1 0 | 0 | 0 | 0 | 0 | 0 | 0 | 0 | 0 |
| 239 | 1 1 1 0 1 1 1 1 | 0 | 0 | 0 | 0 | 0 | 0 | 0 | 0 |
| 240 | 1 1 1 1 0 0 0 0 | 0 | 0 | 0 | 0 | 3 | 2 | 1 | 0 |
| 241 | 1 1 1 1 0 0 0 1 | 0 | 0 | 0 | 0 | 2 | 1 | 0 | 0 |
| 242 | 1 1 1 1 0 0 1 0 | 0 | 0 | 0 | 0 | 1 | 0 | 0 | 0 |
| 243 | 1 1 1 1 0 0 1 1 | 0 | 0 | 0 | 0 | 1 | 0 | 0 | 0 |
| 244 | 1 1 1 1 0 1 0 0 | 0 | 0 | 0 | 0 | 0 | 0 | 1 | 0 |
| 245 | 1 1 1 1 0 1 0 1 | 0 | 0 | 0 | 0 | 0 | 0 | 0 | 0 |
| 246 | 1 1 1 1 0 1 1 0 | 0 | 0 | 0 | 0 | 0 | 0 | 0 | 0 |
| 247 | 1 1 1 1 0 1 1 1 | 0 | 0 | 0 | 0 | 0 | 0 | 0 | 0 |
| 248 | 1 1 1 1 1 0 0 0 | 0 | 0 | 0 | 0 | 0 | 2 | 1 | 0 |
| 249 | 1 1 1 1 1 0 0 1 | 0 | 0 | 0 | 0 | 0 | 1 | 0 | 0 |
| 250 | 1 1 1 1 1 0 1 0 | 0 | 0 | 0 | 0 | 0 | 0 | 0 | 0 |
| 251 | 1 1 1 1 1 0 1 1 | 0 | 0 | 0 | 0 | 0 | 0 | 0 | 0 |
| 252 | 1 1 1 1 1 1 0 0 | 0 | 0 | 0 | 0 | 0 | 0 | 1 | 0 |
| 253 | 1 1 1 1 1 1 0 1 | 0 | 0 | 0 | 0 | 0 | 0 | 0 | 0 |
| 254 | 1 1 1 1 1 1 1 0 | 0 | 0 | 0 | 0 | 0 | 0 | 0 | 0 |
| 255 | 1 1 1 1 1 1 1 1 | 0 | 0 | 0 | 0 | 0 | 0 | 0 | 0 |

Fig.4

TABLE B

| No. | BIT PATTERN | 0 | 1 | 2 | 3 | 4 | 5 | 6 | 7 |
|---|---|---|---|---|---|---|---|---|---|
| 0 | 0 0 0 0 0 0 0 0 | 0 | 0 | 0 | 0 | 0 | 0 | 0 | 0 |
| 1 | 0 0 0 0 0 0 0 1 | 0 | 0 | 0 | 0 | 0 | 0 | 0 | 0 |
| 2 | 0 0 0 0 0 0 1 0 | 0 | 0 | 0 | 0 | 0 | 0 | 0 | 0 |
| 3 | 0 0 0 0 0 0 1 1 | 0 | 0 | 0 | 0 | 0 | 0 | 1 | 0 |
| 4 | 0 0 0 0 0 1 0 0 | 0 | 0 | 0 | 0 | 0 | 0 | 0 | 0 |
| 5 | 0 0 0 0 0 1 0 1 | 0 | 0 | 0 | 0 | 0 | 0 | 0 | 0 |
| 6 | 0 0 0 0 0 1 1 0 | 0 | 0 | 0 | 0 | 0 | 1 | 0 | 0 |
| 7 | 0 0 0 0 0 1 1 1 | 0 | 0 | 0 | 0 | 0 | 2 | 1 | 0 |
| 8 | 0 0 0 0 1 0 0 0 | 0 | 0 | 0 | 0 | 0 | 0 | 0 | 0 |
| 9 | 0 0 0 0 1 0 0 1 | 0 | 0 | 0 | 0 | 0 | 0 | 0 | 0 |
| 10 | 0 0 0 0 1 0 1 0 | 0 | 0 | 0 | 0 | 0 | 0 | 0 | 0 |
| 11 | 0 0 0 0 1 0 1 1 | 0 | 0 | 0 | 0 | 0 | 0 | 1 | 0 |
| 12 | 0 0 0 0 1 1 0 0 | 0 | 0 | 0 | 0 | 1 | 0 | 0 | 0 |
| 13 | 0 0 0 0 1 1 0 1 | 0 | 0 | 0 | 0 | 1 | 0 | 0 | 0 |
| 14 | 0 0 0 0 1 1 1 0 | 0 | 0 | 0 | 0 | 2 | 1 | 0 | 0 |
| 15 | 0 0 0 0 1 1 1 1 | 0 | 0 | 0 | 0 | 3 | 2 | 1 | 0 |
| 16 | 0 0 0 1 0 0 0 0 | 0 | 0 | 0 | 0 | 0 | 0 | 0 | 0 |
| ... | ... | ... | ... | ... | ... | ... | ... | ... | ... |
| 223 | 1 1 0 1 1 1 1 1 | 1 | 0 | 0 | 4 | 3 | 2 | 1 | 0 |
| 224 | 1 1 1 0 0 0 0 0 | 2 | 1 | 0 | 0 | 0 | 0 | 0 | 0 |
| 225 | 1 1 1 0 0 0 0 1 | 2 | 1 | 0 | 0 | 0 | 0 | 0 | 0 |
| 226 | 1 1 1 0 0 0 1 0 | 2 | 1 | 0 | 0 | 0 | 0 | 0 | 0 |
| 227 | 1 1 1 0 0 0 1 1 | 2 | 1 | 0 | 0 | 0 | 0 | 1 | 0 |
| 228 | 1 1 1 0 0 1 0 0 | 2 | 1 | 0 | 0 | 0 | 0 | 0 | 0 |
| 229 | 1 1 1 0 0 1 0 1 | 2 | 1 | 0 | 0 | 0 | 0 | 0 | 0 |
| 230 | 1 1 1 0 0 1 1 0 | 2 | 1 | 0 | 0 | 0 | 1 | 0 | 0 |
| 231 | 1 1 1 0 0 1 1 1 | 2 | 1 | 0 | 0 | 0 | 2 | 1 | 0 |
| 232 | 1 1 1 0 1 0 0 0 | 2 | 1 | 0 | 0 | 0 | 0 | 0 | 0 |
| 233 | 1 1 1 0 1 0 0 1 | 2 | 1 | 0 | 0 | 0 | 0 | 0 | 0 |
| 234 | 1 1 1 0 1 0 1 0 | 2 | 1 | 0 | 0 | 0 | 0 | 0 | 0 |
| 235 | 1 1 1 0 1 0 1 1 | 2 | 1 | 0 | 0 | 0 | 0 | 1 | 0 |
| 236 | 1 1 1 0 1 1 0 0 | 2 | 1 | 0 | 0 | 1 | 0 | 0 | 0 |
| 237 | 1 1 1 0 1 1 0 1 | 2 | 1 | 0 | 0 | 1 | 0 | 0 | 0 |
| 238 | 1 1 1 0 1 1 1 0 | 2 | 1 | 0 | 0 | 2 | 1 | 0 | 0 |
| 239 | 1 1 1 0 1 1 1 1 | 2 | 1 | 0 | 0 | 3 | 2 | 1 | 0 |
| 240 | 1 1 1 1 0 0 0 0 | 3 | 2 | 1 | 0 | 0 | 0 | 0 | 0 |
| 241 | 1 1 1 1 0 0 0 1 | 3 | 2 | 1 | 0 | 0 | 0 | 0 | 0 |
| 242 | 1 1 1 1 0 0 1 0 | 3 | 2 | 1 | 0 | 0 | 0 | 0 | 0 |
| 243 | 1 1 1 1 0 0 1 1 | 3 | 2 | 1 | 0 | 0 | 0 | 1 | 0 |
| 244 | 1 1 1 1 0 1 0 0 | 3 | 2 | 1 | 0 | 0 | 0 | 0 | 0 |
| 245 | 1 1 1 1 0 1 0 1 | 3 | 2 | 1 | 0 | 0 | 0 | 0 | 0 |
| 246 | 1 1 1 1 0 1 1 0 | 3 | 2 | 1 | 0 | 0 | 1 | 0 | 0 |
| 247 | 1 1 1 1 0 1 1 1 | 3 | 2 | 1 | 0 | 0 | 2 | 1 | 0 |
| 248 | 1 1 1 1 1 0 0 0 | 4 | 3 | 2 | 1 | 0 | 0 | 0 | 0 |
| 249 | 1 1 1 1 1 0 0 1 | 4 | 3 | 2 | 1 | 0 | 0 | 0 | 0 |
| 250 | 1 1 1 1 1 0 1 0 | 4 | 3 | 2 | 1 | 0 | 0 | 0 | 0 |
| 251 | 1 1 1 1 1 0 1 1 | 4 | 3 | 2 | 1 | 0 | 0 | 1 | 0 |
| 252 | 1 1 1 1 1 1 0 0 | 5 | 4 | 3 | 2 | 1 | 0 | 0 | 0 |
| 253 | 1 1 1 1 1 1 0 1 | 5 | 4 | 3 | 2 | 1 | 0 | 0 | 0 |
| 254 | 1 1 1 1 1 1 1 0 | 6 | 5 | 4 | 3 | 2 | 1 | 0 | 0 |
| 255 | 1 1 1 1 1 1 1 1 | 7 | 6 | 5 | 4 | 3 | 2 | 1 | 0 |

Fig.5

| No. | BIT PATTERN | TABLE C<br>THE NUMBER OF CONSECUTIVE BLACK PIXELS FROM LEFT IN 1 BYTE | TABLE D<br>THE NUMBER OF CONSECUTIVE WHITE PIXELS FROM LEFT IN 1 BYTE |
|---|---|---|---|
| 0 | 0 0 0 0 0 0 0 0 | 0 | 8 |
| 1 | 0 0 0 0 0 0 0 1 | 0 | 7 |
| 2 | 0 0 0 0 0 0 1 0 | 0 | 6 |
| 3 | 0 0 0 0 0 0 1 1 | 0 | 6 |
| 4 | 0 0 0 0 0 1 0 0 | 0 | 5 |
| 5 | 0 0 0 0 0 1 0 1 | 0 | 5 |
| 6 | 0 0 0 0 0 1 1 0 | 0 | 5 |
| 7 | 0 0 0 0 0 1 1 1 | 0 | 5 |
| 8 | 0 0 0 0 1 0 0 0 | 0 | 4 |
| 9 | 0 0 0 0 1 0 0 1 | 0 | 4 |
| 10 | 0 0 0 0 1 0 1 0 | 0 | 4 |
| 11 | 0 0 0 0 1 0 1 1 | 0 | 4 |
| 12 | 0 0 0 0 1 1 0 0 | 0 | 4 |
| 13 | 0 0 0 0 1 1 0 1 | 0 | 4 |
| 14 | 0 0 0 0 1 1 1 0 | 0 | 4 |
| 15 | 0 0 0 0 1 1 1 1 | 0 | 4 |
| 16 | 0 0 0 1 0 0 0 0 | 0 | 3 |
| 17 | 0 0 0 1 0 0 0 1 | 0 | 3 |
| ⋮ | ⋮ | ⋮ | ⋮ |
| 224 | 1 1 1 0 0 0 0 0 | 3 | 0 |
| 225 | 1 1 1 0 0 0 0 1 | 3 | 0 |
| 226 | 1 1 1 0 0 0 1 0 | 3 | 0 |
| 227 | 1 1 1 0 0 0 1 1 | 3 | 0 |
| 228 | 1 1 1 0 0 1 0 0 | 3 | 0 |
| 229 | 1 1 1 0 0 1 0 1 | 3 | 0 |
| 230 | 1 1 1 0 0 1 1 0 | 3 | 0 |
| 231 | 1 1 1 0 0 1 1 1 | 3 | 0 |
| 232 | 1 1 1 0 1 0 0 0 | 3 | 0 |
| 233 | 1 1 1 0 1 0 0 1 | 3 | 0 |
| 234 | 1 1 1 0 1 0 1 0 | 3 | 0 |
| 235 | 1 1 1 0 1 0 1 1 | 3 | 0 |
| 236 | 1 1 1 0 1 1 0 0 | 3 | 0 |
| 237 | 1 1 1 0 1 1 0 1 | 3 | 0 |
| 238 | 1 1 1 0 1 1 1 0 | 3 | 0 |
| 239 | 1 1 1 0 1 1 1 1 | 3 | 0 |
| 240 | 1 1 1 1 0 0 0 0 | 4 | 0 |
| 241 | 1 1 1 1 0 0 0 1 | 4 | 0 |
| 242 | 1 1 1 1 0 0 1 0 | 4 | 0 |
| 243 | 1 1 1 1 0 0 1 1 | 4 | 0 |
| 244 | 1 1 1 1 0 1 0 0 | 4 | 0 |
| 245 | 1 1 1 1 0 1 0 1 | 4 | 0 |
| 246 | 1 1 1 1 0 1 1 0 | 4 | 0 |
| 247 | 1 1 1 1 0 1 1 1 | 4 | 0 |
| 248 | 1 1 1 1 1 0 0 0 | 5 | 0 |
| 249 | 1 1 1 1 1 0 0 1 | 5 | 0 |
| 250 | 1 1 1 1 1 0 1 0 | 5 | 0 |
| 251 | 1 1 1 1 1 0 1 1 | 5 | 0 |
| 252 | 1 1 1 1 1 1 0 0 | 6 | 0 |
| 253 | 1 1 1 1 1 1 0 1 | 6 | 0 |
| 254 | 1 1 1 1 1 1 1 0 | 7 | 0 |
| 255 | 1 1 1 1 1 1 1 1 | 8 | 0 |

Fig.6

TABLE E

| No. | BIT PATTERN | 0 | 1 | 2 | 3 | 4 | 5 | 6 | 7 |
|---|---|---|---|---|---|---|---|---|---|
| 0 | 0 0 0 0 0 0 0 0 | 0 | 0 | 0 | 0 | 0 | 0 | 0 | 0 |
| 1 | 0 0 0 0 0 0 0 1 | 0 | 0 | 0 | 0 | 0 | 0 | 0 | 1 |
| 2 | 0 0 0 0 0 0 1 0 | 0 | 0 | 0 | 0 | 0 | 0 | 1 | 0 |
| 3 | 0 0 0 0 0 0 1 1 | 0 | 0 | 0 | 0 | 0 | 0 | 1 | 1 |
| 4 | 0 0 0 0 0 1 0 0 | 0 | 0 | 0 | 0 | 0 | 1 | 0 | 0 |
| 5 | 0 0 0 0 0 1 0 1 | 0 | 0 | 0 | 0 | 0 | 1 | 0 | 1 |
| 6 | 0 0 0 0 0 1 1 0 | 0 | 0 | 0 | 0 | 0 | 1 | 1 | 0 |
| 7 | 0 0 0 0 0 1 1 1 | 0 | 0 | 0 | 0 | 0 | 1 | 1 | 1 |
| 8 | 0 0 0 0 1 0 0 0 | 0 | 0 | 0 | 0 | 1 | 0 | 0 | 0 |
| 9 | 0 0 0 0 1 0 0 1 | 0 | 0 | 0 | 0 | 1 | 0 | 0 | 1 |
| 10 | 0 0 0 0 1 0 1 0 | 0 | 0 | 0 | 0 | 1 | 0 | 1 | 0 |
| 11 | 0 0 0 0 1 0 1 1 | 0 | 0 | 0 | 0 | 1 | 0 | 1 | 1 |
| 12 | 0 0 0 0 1 1 0 0 | 0 | 0 | 0 | 0 | 1 | 1 | 0 | 0 |
| 13 | 0 0 0 0 1 1 0 1 | 0 | 0 | 0 | 0 | 1 | 1 | 0 | 1 |
| 14 | 0 0 0 0 1 1 1 0 | 0 | 0 | 0 | 0 | 1 | 1 | 1 | 0 |
| 15 | 0 0 0 0 1 1 1 1 | 0 | 0 | 0 | 0 | 1 | 1 | 1 | 1 |
| 16 | 0 0 0 1 0 0 0 0 | 0 | 0 | 0 | 1 | 0 | 0 | 0 | 0 |
| ... | ... | ... | ... | ... | ... | ... | ... | ... | ... |
| 223 | 1 1 0 1 1 1 1 1 | 1 | 1 | 0 | 1 | 1 | 1 | 1 | 1 |
| 224 | 1 1 1 0 0 0 0 0 | 1 | 1 | 1 | 0 | 0 | 0 | 0 | 0 |
| 225 | 1 1 1 0 0 0 0 1 | 1 | 1 | 1 | 0 | 0 | 0 | 0 | 1 |
| 226 | 1 1 1 0 0 0 1 0 | 1 | 1 | 1 | 0 | 0 | 0 | 1 | 0 |
| 227 | 1 1 1 0 0 0 1 1 | 1 | 1 | 1 | 0 | 0 | 0 | 1 | 1 |
| 228 | 1 1 1 0 0 1 0 0 | 1 | 1 | 1 | 0 | 0 | 1 | 0 | 0 |
| 229 | 1 1 1 0 0 1 0 1 | 1 | 1 | 1 | 0 | 0 | 1 | 0 | 1 |
| 230 | 1 1 1 0 0 1 1 0 | 1 | 1 | 1 | 0 | 0 | 1 | 1 | 0 |
| 231 | 1 1 1 0 0 1 1 1 | 1 | 1 | 1 | 0 | 0 | 1 | 1 | 1 |
| 232 | 1 1 1 0 1 0 0 0 | 1 | 1 | 1 | 0 | 1 | 0 | 0 | 0 |
| 233 | 1 1 1 0 1 0 0 1 | 1 | 1 | 1 | 0 | 1 | 0 | 0 | 1 |
| 234 | 1 1 1 0 1 0 1 0 | 1 | 1 | 1 | 0 | 1 | 0 | 1 | 0 |
| 235 | 1 1 1 0 1 0 1 1 | 1 | 1 | 1 | 0 | 1 | 0 | 1 | 1 |
| 236 | 1 1 1 0 1 1 0 0 | 1 | 1 | 1 | 0 | 1 | 1 | 0 | 0 |
| 237 | 1 1 1 0 1 1 0 1 | 1 | 1 | 1 | 0 | 1 | 1 | 0 | 1 |
| 238 | 1 1 1 0 1 1 1 0 | 1 | 1 | 1 | 0 | 1 | 1 | 1 | 0 |
| 239 | 1 1 1 0 1 1 1 1 | 1 | 1 | 1 | 0 | 1 | 1 | 1 | 1 |
| 240 | 1 1 1 1 0 0 0 0 | 1 | 1 | 1 | 1 | 0 | 0 | 0 | 0 |
| 241 | 1 1 1 1 0 0 0 1 | 1 | 1 | 1 | 1 | 0 | 0 | 0 | 1 |
| 242 | 1 1 1 1 0 0 1 0 | 1 | 1 | 1 | 1 | 0 | 0 | 1 | 0 |
| 243 | 1 1 1 1 0 0 1 1 | 1 | 1 | 1 | 1 | 0 | 0 | 1 | 1 |
| 244 | 1 1 1 1 0 1 0 0 | 1 | 1 | 1 | 1 | 0 | 1 | 0 | 0 |
| 245 | 1 1 1 1 0 1 0 1 | 1 | 1 | 1 | 1 | 0 | 1 | 0 | 1 |
| 246 | 1 1 1 1 0 1 1 0 | 1 | 1 | 1 | 1 | 0 | 1 | 1 | 0 |
| 247 | 1 1 1 1 0 1 1 1 | 1 | 1 | 1 | 1 | 0 | 1 | 1 | 1 |
| 248 | 1 1 1 1 1 0 0 0 | 1 | 1 | 1 | 1 | 1 | 0 | 0 | 0 |
| 249 | 1 1 1 1 1 0 0 1 | 1 | 1 | 1 | 1 | 1 | 0 | 0 | 1 |
| 250 | 1 1 1 1 1 0 1 0 | 1 | 1 | 1 | 1 | 1 | 0 | 1 | 0 |
| 251 | 1 1 1 1 1 0 1 1 | 1 | 1 | 1 | 1 | 1 | 0 | 1 | 1 |
| 252 | 1 1 1 1 1 1 0 0 | 1 | 1 | 1 | 1 | 1 | 1 | 0 | 0 |
| 253 | 1 1 1 1 1 1 0 1 | 1 | 1 | 1 | 1 | 1 | 1 | 0 | 1 |
| 254 | 1 1 1 1 1 1 1 0 | 1 | 1 | 1 | 1 | 1 | 1 | 1 | 0 |
| 255 | 1 1 1 1 1 1 1 1 | 1 | 1 | 1 | 1 | 1 | 1 | 1 | 1 |

Fig.7

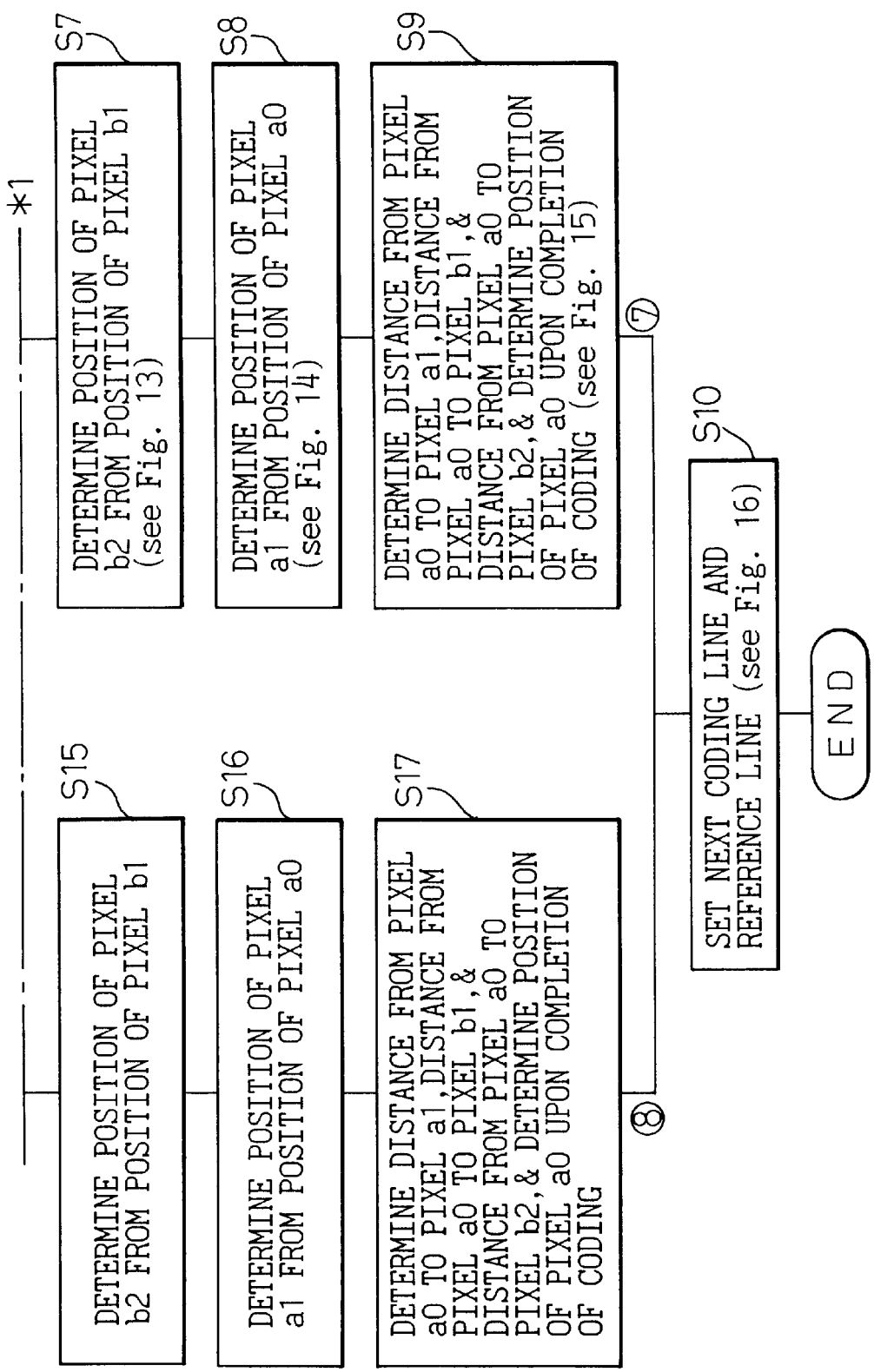

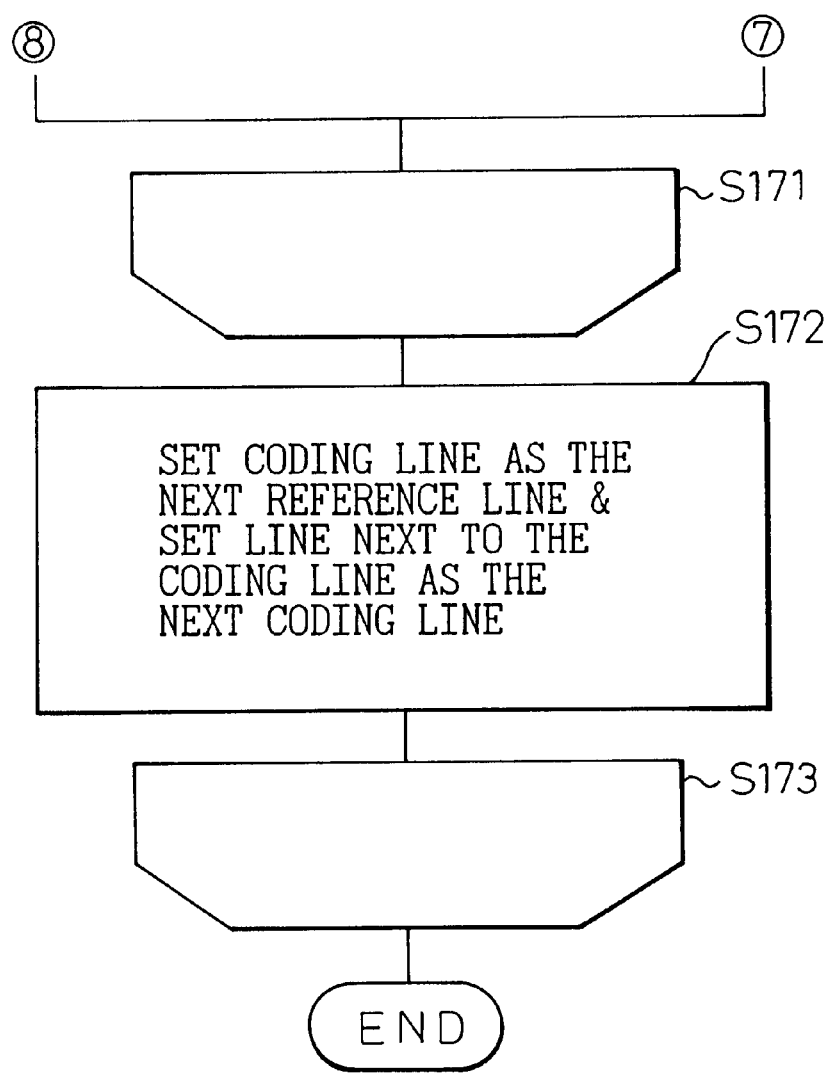

DATA COMPRESSION PROCESSING METHOD AND APPARATUS

BACKGROUND OF THE INVENTION

1. Field of the Invention

The present invention generally relates to a data compression processing method and apparatus for compressing still image data and, more particularly, to a data compression processing method and apparatus able to achieve high-speed compression processing by reducing a processing time required to perform compression processing on still image data according to a Modified Modified READ (or Relative element address designate) coding scheme (hereunder referred to simply as an MMR coding scheme).

2. Description of the Related Art

Currently, a still image of a document, which is handled by a facsimile, is fundamentally a binary image, each pixel of which is represented by two levels, that is, white and black levels. Thus, the image consists of pixels represented by binary image data.

Further, in binary document images handled by a facsimile, sequences of a certain number of consecutive white pixels or black pixels frequently appear. Thus, usually, data compression processing is performed on such mass binary image data by using the MMR coding scheme and coding positions in each of which a change in color between a white run and a black run occurs.

In the case of the compression processing of image data according to this MMR coding scheme, among pixels of a coding line in an image, the position of a changing pixel, at which the color thereof changes from that of the consecutive pixels of the preceding sequence, is coded. Further, the line preceding the coding line is employed as a reference line. Then, the distance between a changing pixel, at which the color thereof changes from that of the consecutive pixels of the preceding sequence, of the reference line and the changing pixel of the coding line is coded.

Thus, to perform the compression processing of image data according to the MMR coding scheme, the positions of changing pixels a0, a1, and a2 of the bottom line, namely, the coding line, and those of the changing pixels b1, and b2 of the top line, namely, the reference line are detected. After the positions of these changing pixels are detected, the coding is performed by selecting one of a pass mode, a vertical mode, and a horizontal mode according to the positional relation among a starting or reference changing pixel a0, and the changing pixels a1, a2, b1, and b2 (defined in CCITT Recommendation T.6).

However, in the case of image data of high resolution, for example, the distance between the starting changing pixel a0 and the changing pixel a1 is long. Thus, the number of bits corresponding to this distance is very large.

In the case of the related art coding scheme, the position of a current pixel is shifted from the position of the pixel a0 bit by bit until a black pixel is detected. The position of the detected black pixel is designated by "a1". Further, the number of times of shifting the position from a0 to a1 is determined as the distance therebetween.

In this way, the process proceeds by repeating the shifting of the current position of the changing pixel until a black pixel is detected. Further, the position of the detected black pixel is designated by "a1". Thus, in the case that the distance between the pixels a0 and a1 is long, the number of times of shifting the current position of the changing pixel, which is needed for detecting the position of the pixel a1, is large.

Such a process proceeds by shifting the position bit by bit for detecting the position of each of the pixels a2, b1, and b2 in addition to the pixel a1. Thus, the higher the resolution of a still image, the larger the number of times of shifting the current position of the changing pixel. Consequently, a long processing time is required to achieve the coding.

Accordingly, an object of the present invention is to realize high speed compression processing, which is performed according to the MMR coding scheme, by reducing the number of times of repeating the shifting process, which is required to detect the positions of the changing pixels a1, a2, b1, and b2.

SUMMARY OF THE INVENTION

To achieve the foregoing object, according to an aspect of the present invention, there is provided a data compression processing method, which comprises the steps of producing a bit string corresponding to pixel data obtained from an image, and sequentially fetching data byte by byte from the bit string, searching a table describing the number of consecutive bits that are arranged to the right of and have the same color as each of bits of each byte of all bit patterns represented by bits included in 1 byte, and detecting the number of consecutive bits that are arranged to the right of and have the same color as each of bits of each of the fetched bytes according to the bit patterns represented by bits of each of the fetched bytes, and detecting the number of consecutive bits that are arranged to the right of and have the same color as each of bits of each fetched byte, and determining a pixel placed at a position corresponding to a number obtained by adding 1 to the detected number of consecutive bits, as a color changing pixel, and thus obtaining the position of each changing pixel in each of the sequentially fetched bytes, and coding the image data according to the position of each of the changing pixels.

Further, according to an embodiment of this compression processing method of the present invention, a reference line and a coding line are set according to the bit string. Then, a bit string of each of the reference line and the coding line is produced. Subsequently, data are sequentially fetched byte by byte from each of the reference line and the coding line. Subsequently, the positions of changing pixels on each of the reference line and the coding line are obtained. Then, the MMR coding is performed by computing the distance between the changing pixels. Thus, the position of the starting changing pixel on the coding line is set to be the position of the starting changing pixel on the reference line.

Moreover, according to another aspect of the present invention, there is provided a data compression processor, which comprises an input buffer, to which pixel data of an image is inputted, for producing and holding a bit string, a lookup table unit for storing at least a table that describes the number of bits, which are arranged to the right of and have the same color as each of bits of each byte of all bit patterns represented by bits included in 1 byte, and a compression processing unit for fetching a bit string of image data from the input buffer. The compression processing unit reads the pixel data from the input buffer byte by byte, and performs compression processing by obtaining the position of a changing pixel according to the number of bits of the same color as that of each of bits detected from the table according to bit patterns that are represented by bits included in the read byte.

BRIEF DESCRIPTION OF THE DRAWINGS

Other features, objects and advantages of the present invention will become apparent from the following descripings in which like reference characters designate like or corresponding parts throughout several views, and in which:

FIG. 1 is a diagram illustrating the outline of the configuration of a compression processor;

FIGS. 2(A) and 2(B) are diagrams each illustrating pixel lines to be coded according to the MMR coding scheme;

FIG. 3 is a table including Table A that describes the number of consecutive white pixels to the right of an xth bit in 1 byte;

FIG. 4 is a table including Table B that describes the number of consecutive black pixels to the right of an xth bit in 1 byte;

FIG. 5 is a table including Table C, which describes the number of consecutive black pixels from the left 1 byte, and also including Table D, which describes the number of consecutive while pixels from the left in 1 byte;

FIG. 6 is a table including Table E that describes the color of an xth bit in 1 byte;

Figure 7:
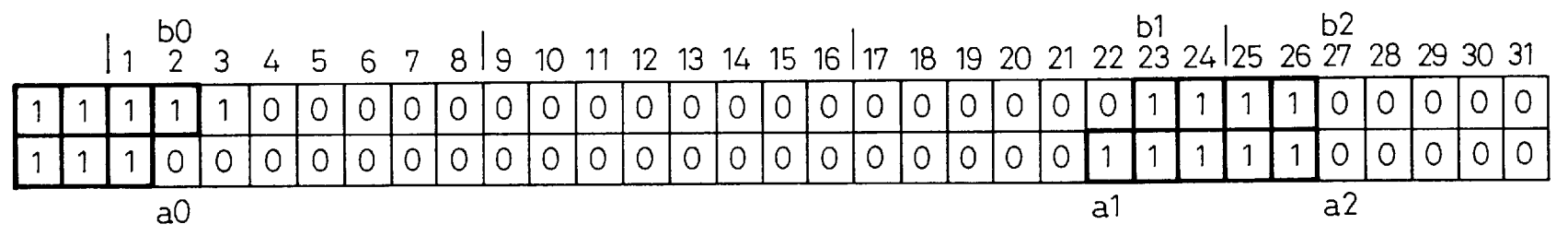

FIG. 7 is a diagram illustrating a practical example of pixel lines used in this embodiment;

FIG. 16 is a flowchart illustrating the details of step S10 of FIG. 8(B).

DETAILED DESCRIPTION OF THE PREFERRED EMBODIMENTS

Figure 8A:
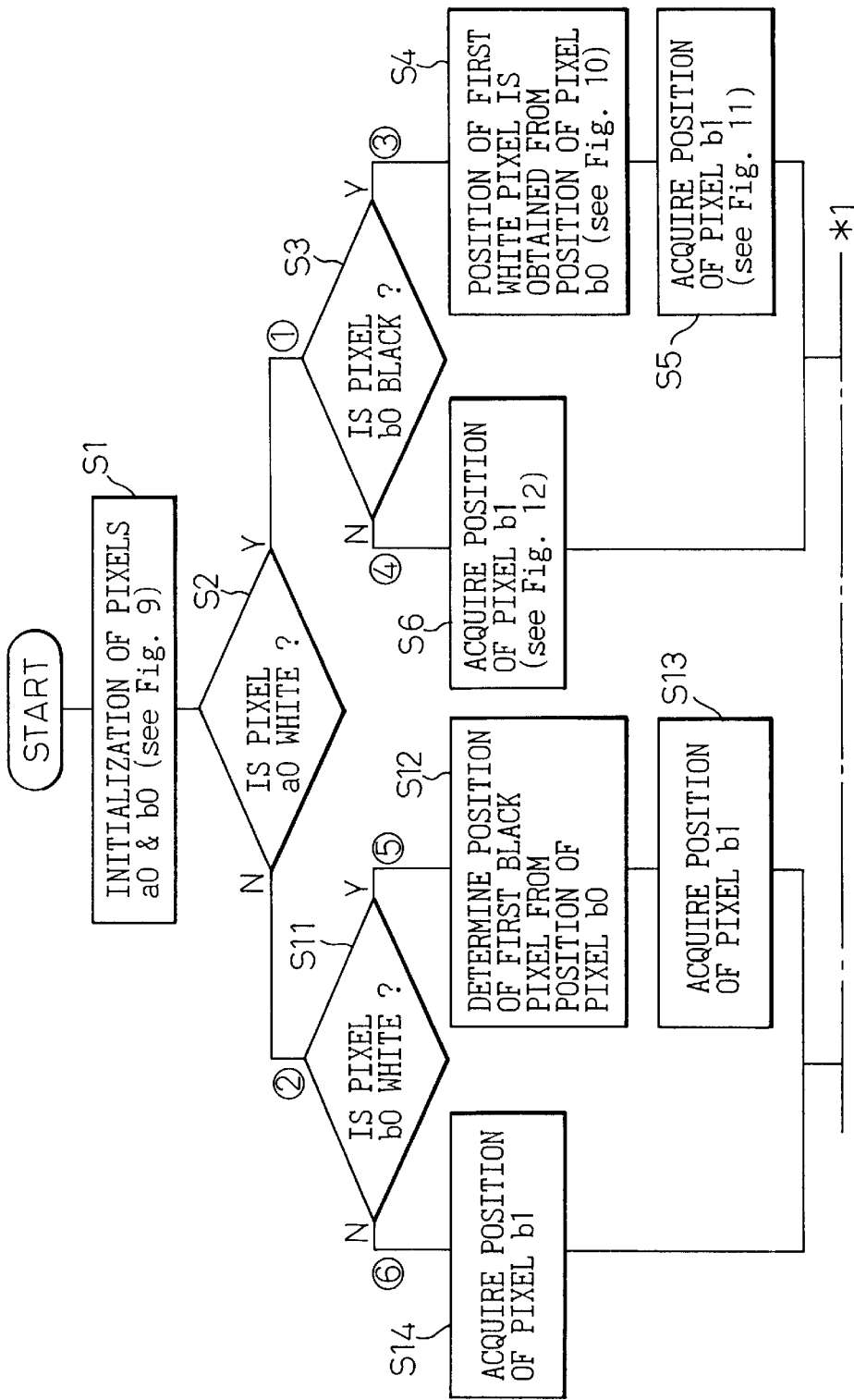
FIGS. 8(A) and (B) is a flowchart illustrating the entire flow of compression processing according to this embodiment.

Before describing the preferred embodiments of the present invention, the related art and the disadvantages thereof will be described hereinbelow by referring to the accompanying drawings.

FIG. 1 illustrates the configuration of a related art data compression processor using the MMR coding scheme.

A precompression data storage unit 2 is connected to the input side of the data compression processor 1. Further, a postcompression data storage unit 3 is connected to the output side of the processor 1.

The compression processor 1 consists of an input buffer 4, a compression processing unit 5, an output buffer 6, and a lookup table unit 7.

The precompression data storage unit 2 stores binary image data that is read so as to, for example, facsimile-transmit a document. Further, the postcompression data storage unit 3 sequentially stores image data that is coded by the compression processor 1.

The compression processor 1 performs compression processing as follows. First, binary image data sampled at a rate of 8 bits per mm is read to the input buffer 4 from the precompression data storage unit 2. This input data is sent to the compression processing unit 5, in which the read image data is coded by referring to a Modified Huffman (MH) code table and a Modified READ (MR) code table stored in the lookup table unit 7. The coded data is sent to the output buffer 6. Subsequently, the coded data is stored in the postcompression data storage unit 3.

Hereinafter, an outline of the compression processing of the coded binary image data is described with reference to FIG. 2(A).

FIG. 2(A) schematically illustrates a bit arrangement of the binary data read from the precompression data storage unit 2 to the input buffer 4. In this figure, each square represents 1 bit. Further, each thin-bordered square represents a white pixel. Moreover, each thick-bordered square represents a black pixel.

Furthermore, the top line represents a reference line, while the bottom line represents a coding line. A line of image data coded and transmitted immediately before reading of image data on the coding line is used as image data on the reference line. Further, image data newly read from the precompression data storage unit 2 to the input buffer 4 used as the image data on the coding line.

According to the MMR coding scheme, the positions of white and black changing pixels arranged on each line of pixels are coded. Further, the distance between the white and black changing pixels on the reference line is coded. Thus, in the case that the changing pixels are as illustrated in FIG. 2(A), the positions of the changing pixels a0, a1, and a2 on the bottom or coding line, and those of the changing pixels b1 and b2 on the top or reference line should be detected.

Incidentally, on the coding line, reference character a0 designates a starting changing pixel. Reference character a1 denotes the next changing pixel to the right of the pixel a0. Reference character a2 designates the next changing pixel to the right of the pixel a1. On the reference line, reference character b1 designates the next changing pixel to the right of the pixel a0 and of opposite color of the pixel a0. Reference character b2 denotes the next changing pixel to the right of the pixel b1.

Next, the coding of image data in the case, in which white and black pixels are arranged on the coding line and the reference line as illustrated in FIG. 2(A), is described hereinbelow.

The coding is performed by selecting one of a pass mode, a vertical mode, and a horizontal mode according to the positional relation among the starting changing pixel a0, and the changing pixels a1, a2, b1, and b2.

The pass mode is selected when the changing pixel b2 lies to the left of the changing pixel a1. In the case of this pass mode, the position of the changing pixel a0 is changed to a position just under the changing pixel b2. FIG. 2(A) illustrates a state in which the position of the pixel a0 has been changed to the position just under the pixel b2 upon completion of coding in the pass mode.

The position of the changing pixel b2 shown in FIG. 2(A) lies to the right of the changing pixel a1. Thus, the coding of the position of the pixel a1 is performed in the vertical mode in which the relative distance a1-b1 between the pixels a1 and b1 is less than or equal to 3 (that is, these changing pixels are within a 3-pixel range). Thus, a vertical-mode-coding code "010", corresponding to the distance a1-b1, which is 1, is read from the MR code table of the lookup table unit 7, and transmitted to the output buffer 6. Then, the pixel a0 is moved to the position (a0) of the pixel a1. Further, the pixel a1 is moved to the position (a1) of the pixel a2. Moreover, the pixel b1 is moved to the position (b1) of the pixel b2.

Subsequently, when the position (a0) is taken as the position of a starting point, the coding of the position (a0) is performed in the vertical mode. Thus, a vertical mode coding code "1" corresponding to a distance of 0 is read from the MR code table, and transmitted to the output buffer 6. Further, the position (a0) is changed to the position (a1).

When neither the pass mode nor the vertical mode occurs, a code corresponding to the run length of the white pixels a0 to a1, and a code corresponding to the run length of the black pixels a1 to a2 are read from the MH code table of the lookup table unit 7, and then transmitted to the output buffer 6. Further, the pixel a0 is moved to the position (a0) of the pixel a2.

Thus, as a result of coding the positions of the pixels illustrated in FIG. 2(A), a code " ... 0101 ... " is obtained. Consequently, the positions of the pixels on the coding line are coded according to the distances between the pixels on the coding line and the pixels on the reference line.

However, for instance, in the case of image data of high resolution as illustrated in FIG. 2(B), the distance between the starting changing pixel a0 and the changing pixel a1 is long. Thus, the number of bits corresponding to this distance is very large.

According to the related art coding scheme, the aforementioned process is repeated until a black pixel is detected. Then, the data compression process is proceeded by using the position of the detected black pixel as that of a changing pixel. Thus, in the case that the distance between the pixels a0 and a1 is long, the number of times of shifting the current position of the changing pixel, which is needed for detecting the position of the pixel a1, is large.

Accordingly, the present invention provides a high speed MMR compression processing method by reducing the number of times of repeating the process of detecting the positions of changing pixels a1, a2, b1, and b2.

Hereinafter, an embodiment of the present invention is described with reference to FIGS. 3 to 16.

According to the related art MMR compression processing, when the changing pixels a1, a2, b1, and b2 are detected, the data are processed bit by bit. Then, the coding is performed by referring to the MR code table and the MH code table.

In the case of this embodiment, each line of pixel data representing white and black pixels is divided into bytes, in each of which white and black pixel patterns are detected, and the run length of a sequence of consecutive pixels of the same color and the positions of changing pixels are obtained from a preliminarily prepared table of bit patterns, instead of detecting the positions of the changing pixels a1, a2, b1, and b2 by processing data bit by bit. This table is stored in the lookup table unit 7 of the compression processor 1 illustrated in FIG. 1.

Then, each line of pixels is divided by setting 1 byte in such a way as to consist of 8 bits. At that time, arrangement patterns of white or black pixels represented by 8 pixels can be obtained. However, all the arrangement patterns of white or black pixels, that is, 256 patterns can be predicted. Assuming that each of such pixels is represented by 1 bit, and that each white pixel is indicated by "0", and each black pixel is indicated by "1", 256 bit-patterns each represented by binary values "0" and "1" can be generated.

Incidentally, 5 kinds of tables are prepared so as to obtain the run length of each sequence of consecutive pixels of the same color and the positions of the changing pixels, each of which is different in color from that of a just preceding sequence of consecutive pixels, on each line of pixels, which is divided into bytes, in the MMR compression processing.

The five kinds of tables are Table A indicating the number of white consecutive pixels to the right of an xth bit in each byte (x=0, ..., 7), Table B indicating the number of black consecutive pixels to the right of an xth bit in each byte (x=0, ..., 7), Table C indicating the number of black consecutive pixels from the left end in each byte, Table D indicating the number of white consecutive pixels from the left end in each byte, and Table E indicating the color (namely, white or black) of an xth bit (x=0, ..., 7) in each byte.

FIG. 3 illustrates Table A. Incidentally, this figure illustrates Table A by omitting a part thereof. All the arrangement patterns, each of which is represented by 8 bits each having a binary value "0" or "1", are 256 bit-patterns. Thus, such bit patterns are described in rows of a column of Table A, respectively. Further, the number of white consecutive pixels to the right of an xth bit (x=0, ..., 7) is described in a column, which corresponds to the xth bit, of columns arranged in the x-direction of each of the rows, which correspond to the bit patterns, of Table A.

In an actual Table A, the bit patterns are indicated by binary numbers, instead of describing the number of white pixels correspondingly to each of the bit patterns. When such binary numbers are converted into numbers in a decimal format, decimal numbers 0 to 255 are obtained. Thus, the 256 bit patterns can be designated by the decimal numbers in the column "NO." of Table A.

Each of the numbers of white consecutive pixels at an xth bit or pixel, which are described in Table A, does not include the xth pixel. Thus, for example, in the case of the row "0" of the column "NO.", the number of white consecutive pixels to the right of 0'th pixel is 7. Further, the number of white consecutive pixels to the right of 3rd pixel is 4. Furthermore, in the case of the row "4" of the column "NO.", the number of white consecutive pixels to the right of 4th pixel is 0, because the 5th pixel is black one and thus there are no white consecutive pixels immediately to the right of the 4th pixel. Further, the number of white consecutive pixels to the right of 6th pixel is 1, because there is one white pixel to the right of the 6th pixel.

FIG. 4 illustrates Table B, which is created by a technique similar to that of generating Table A. However, the number of black consecutive pixels to the right of an xth bit (x=0, ...,7) is described in a column, which corresponds to the xth bit, of columns arranged in the x-direction of each of the rows, which correspond to the bit patterns, of Table B. The manner of reading Table B is similar to that of reading Table A.

FIG. 5 illustrates Table C and Table D. Each of these tables indicates the number of consecutive pixels of a corresponding color, namely, black or white from the left end in a byte corresponding to each of the bit patterns. In each of these tables, the 256 bit patterns are designated in the column "NO.", similarly as in the case of Table A and Table B.

Table C indicates the number of consecutive black pixels from the left end in each byte, while Table D indicates the number of consecutive white pixels from the left end in each byte. For example, in the case of the row "0" of the column "NO.", all 8 bits represent white pixels. Thus, as indicated in the case of the row "0" of Table C, the number of consecutive black pixels is "0". Further, as indicated in the case of the row "0" of Table D, the number of consecutive white pixels is "8". Moreover, in the case of the row "4" of the column "NO.", there is a black pixel correspondingly to the 5th bit. However, this black pixel does not belong to a sequence of consecutive black pixels from a leftmost pixel. Thus, as indicated in the case of the row "4" of Table C, the number of consecutive black pixels is "0". Further, there is a sequence of consecutive white pixels from the leftmost white pixel, so that "5" is indicated as the number of white pixels in the case of the row "4" of Table D.

FIG. 6 illustrates Table E that indicates the color (namely, white or black) of an xth bit in each byte. Similarly as the other tables, Table E describes the color of each of the xth bits (x=0, . . . , 7) in each of the bytes respectively corresponding to the 256 bit patterns. In this case, the color is black or white. Thus, each bit representing a white pixel has a binary value of "0", while each bit representing a black pixel has a binary value of "1".

For instance, in the case of the row "0" of the column "No.", since all pixels in a byte are white, all the bits of the byte have a binary value "0". Further, in the case of the row "4" of the column "NO.", because there is one black pixel corresponding to the 5th bit, the binary value "1" representing this black pixel is indicated in the same row of the column "5" corresponding to the 5th bit has a binary value of "1", while the binary value "0" is indicated in the same row of each of the columns "0", "1", . . . "4", "6", "7" respectively corresponding to the remaining bits.

The aforementioned five kinds of tables, namely, Table A, . . . , Table E are stored in the lookup table unit 7, and referred to by the compression processing unit 5 so as to detect the positions of the changing pixels a1, a2, b1, and b2, and the run length of consecutive pixel of a color, namely, black or white, depending upon which of white and black pixels the current pixel in question is.

Incidentally, a practical example of the case of finding the position of the pixel a1 on the coding line shown in FIGS. 2(A) and 2(B) is described hereinbelow.

FIG. 2(A) illustrates the case that the pixel a0 is a white pixel, and that both the pixels a0 and a1 are present in 1 byte.

As is seen from this figure, the bit pattern in this 1 byte is "00000111". Thus, in Table A, this bit pattern is searched for. This bit pattern represents a decimal "7". Thus, the row "7" of the column "NO." of Table A is selected. Further, the position a0 corresponds to the first bit. Thus, as is seen from the same row of the column "1" corresponding to the first bit, the number of consecutive white pixels to the right of the first bit is 3.

Then, the position a0 corresponds to the second bit from the leftmost or most significant bit of 1 byte. Thus, the number of a sequence of consecutive white pixels from the leftmost bit is 2+3=5. A changing pixel, that is, a black pixel in this case is next to the rightmost white pixel of these five consecutive white pixels, so that the position of this rightmost white pixel is determined as the position a1. Thus, the position of the changing pixel a1 on the coding line of FIG. 2(A) is obtained.

Incidentally, when the color of the pixel a0 is black, Table B is referred to, instead of Table A.

Next, the case in which the position of the pixel a1 is obtained when the pixels a0 and a1 are present in different bytes, as illustrated in FIG. 2(B), is described hereinbelow. In this case, it is assumed that the pixel a0 is a white pixel.

First, in Table A, the number of consecutive white pixels to the right of the pixel a0 in a first or leftmost byte is searched for. Because of the fact that all the eight bits are white ones, the row "0" of the column "NO." is selected. Then, as is seen from the same row of the column "1" corresponding to the first bit, the number of consecutive white pixels to the right of the pixel is 8.

Next, in Table D, the number of consecutive white pixels to the right of the pixel a0 in the next byte is searched for. However, in this byte, no black pixels are present. That is, all the pixels corresponding to the bits of this byte are white ones. Thus, the row "0" of the column "NO." of Table D is selected. Then, the leftmost bit of this byte should be checked. As is seen from the same row of the column "0" corresponding to the 0'th bit, the number of consecutive pixels is 8.

Further, in the case of FIG. 2(B), a first black pixel appears in a third byte. The bit pattern of this byte is "00000111". Thus, the row "7" of the column "NO." of Table D is selected. As is seen from the same row of the column "0" thereof, the number of consecutive white pixels is 5.

Thus, Table A and Table D are searched over again for the number of consecutive white pixels byte by byte until a first black pixel subsequent to the sequence of consecutive white pixels is detected. When the first black pixel is detected, the position of this pixel is determined as that of the changing pixel a1. The address of the position a1 is the 6th bit from the leftmost bit of the byte to the right of the next byte that is next to the byte in which the position a0 is present. Thus, the number of consecutive white pixels to the right of the pixel a0 is 6+8+5=19. Then, 1 is added to this number of consecutive white pixels, so that the position of the changing pixel a1 is 20th bit to the right of the pixel a0.

Incidentally, in this case, it is assumed that the pixel a0 is white. However, when the pixel a0 is black, Table B and Table C are referred to.

As described above, the positions of the pixels and the run-length of consecutive pixels of the same color are detected by referring to the tables according to the bit pattern of each byte. Thus, as compared with the conventional case of detecting the changing pixel bit by bit, the processing time is considerably reduced. For example, in the case of the sequence of the pixels of FIG. 2B, the related art method to perform the aforementioned process 20 times so as to obtain the position of the changing pixel a1. However, according to this embodiment, the position of the pixel a1 can be obtained by performing the process 6 times.

In the herein-above description, the operation of referring to each of the tables according to the bit pattern in each byte has been described. Next, the details of the operation of detecting the positions of the changing pixels a0, a1, and a2, on the coding line and those of the changing pixels b0, b1, and b2, and of obtaining the distance therebetween in the compression processing employing the MMR coding scheme are described hereinbelow by referring to a practical bit pattern of FIG. 7 and to flowcharts of FIGS. 8(A) to 16.

FIG. 7 illustrates pixel lines, one of which is similar to that illustrated in FIG. 2(B). However, in the case illustrated in FIG. 7, a reference line is added to and just above a coding line. White pixels are represented by thin-bordered squares in each of which "0" is inserted. Black pixels are represented by thick-bordered squares in each of which "1" is inserted. Further, the bit pattern of FIG. 7 is in a state in which the coding is performed on the lines in the middle of the image.

Incidentally, in the case of employing the related art MMR coding scheme illustrated in FIG. 2B, the position of a changing pixel is shifted from the starting changing pixel a0 bit by bit. The position of the changing pixel b1 on the reference line is detected by shifting the position from the starting changing pixel a0 bit by bit. Thus, a starting changing pixel b0 on the reference line is unnecessary. However, in the case of this embodiment, the position of each of the changing pixels on each line is obtained by referring to each of the tables according to the bit pattern of each byte. Thus, the starting changing pixel b0 on the reference line is needed.

FIGS. 8(A) and 8(B) is a flowchart illustrating an outline of the entire compression processing according to this embodiment employing the MMR coding scheme. The details of each step illustrated in this flowchart will be described by referring to FIGS. 9 to 16.

The outline of the compression processing is described by referring to FIG. 7.

It is assumed that upon completion of coding of the preceding lines, a white starting changing pixel a0 is set at a second bit designated by "2" above the reference line. At that time, it is necessary to set a starting charging pixel. Thus, at step S1, a pixel just above the white starting charging pixel a0 on the reference line is set as the starting charging pixel b0 at the second bit.

Then, at step S2, to speed up the processing, the process to be performed is determined according to whether or not the changing pixel a0 is white.

In the case of the pixel lines illustrated in FIG. 7, the pixel a0 is white (Y). Subsequently, it is decided at step S3 whether or not the starting pixel b0 on the set reference line is black.

Meanwhile, the changing pixel b1 on the reference line should be positioned to the right of the starting changing pixel a0, and should be a first changing pixel of an opposing color to the color of the pixel a0. Thus, when the pixel b0 is white (N), the first changing pixel b1 of the opposing color to the color of the pixel b0 can be easily detected at step S6 by obtaining the number of consecutive white pixels to the right of the pixel b0.

However, when the pixel b0 is black, which is the opposing color to the color of the pixel a0 (Y), the number of consecutive black pixels to the right of this pixel b0 should be detected. Further, to detect a first black changing pixel, a white pixel, which is next to the rightmost one of the consecutive black pixels and positioned at a fourth bit, should be detected. Thus, at step S4, it is necessary to detect the position of a first white pixel to the pixel b0 on the reference line.

Subsequently, in the case that the position of the first white pixel is detected from that of the pixel b0, the first black changing pixel b1 (at a 23rd bit) can be detected at step S5 by obtaining the number of consecutive white pixels to the right of this first white pixel.

When the position of the changing pixel b1 is detected, the position (that is, a 27th bit in this case) of the changing pixel b2 can be obtained at step S7 by finding the number of consecutive black pixels to the right of the changing pixel b1.

Thus, the pixels b1 and b2 on the reference line are detected. Subsequently, the position of the changing pixel a1 on the coding line is detected at step S8. In this case, the pixel a0 is white. Therefore, the first changing pixel a1 on the coding line can be detected by obtaining the number of consecutive white pixels to the right of the pixel a0.

Thus, the positions of the changing pixels a1, b1, and b2 are found. Then, the distance from the pixel a0 to the pixel a1, that from the pixel a0 to the pixel b1, that from the pixel a0 to the pixel b2 are computed. The horizontal mode coding, the vertical mode coding, and the pass mode coding are performed according to the positional relation among these changing pixels, and the distances among the pixels at step S9.

At this step S9, further, the position (that is, a 27th bit) of the changing pixel a2 is obtained. The obtained position of the pixel a2 is set as the position of the starting changing pixel a0 for the next coding.

Then, the coding is performed according to the new starting changing pixel a0. Subsequently, the coding is performed serially on the pixels on a line. Upon completion of coding of the line in question, the line, on which the coding has been completed, is set at step S10 as a reference line for the next coding.

In the case of the aforementioned process flow, the starting changing pixel a0 is white as illustrated in FIG. 7. However, the process flow consisting of steps S11 to S17 describes the case that the starting changing pixel a0 is black. The process flow in the case in which the pixel a0 is black, is fundamentally similar to the process flow in the case in which the pixel a0 is white. Thus, the description of the process flow in the case in which the pixel a0 is black is omitted.

Incidentally, the process flow in the case in which the pixel a0 is black is obtained by reversing the color in the process flow in the case that the pixel a0 is white. At that time, these cases differ from each other in the tables to be referred to.

The entire flow of the compression processing in this embodiment according to the MMR coding scheme has been described. Next, the details of each step of FIGS. 8(A) and 8(B) are described hereinbelow by referring to FIG. 9 to FIG. 16.

Figure 9:
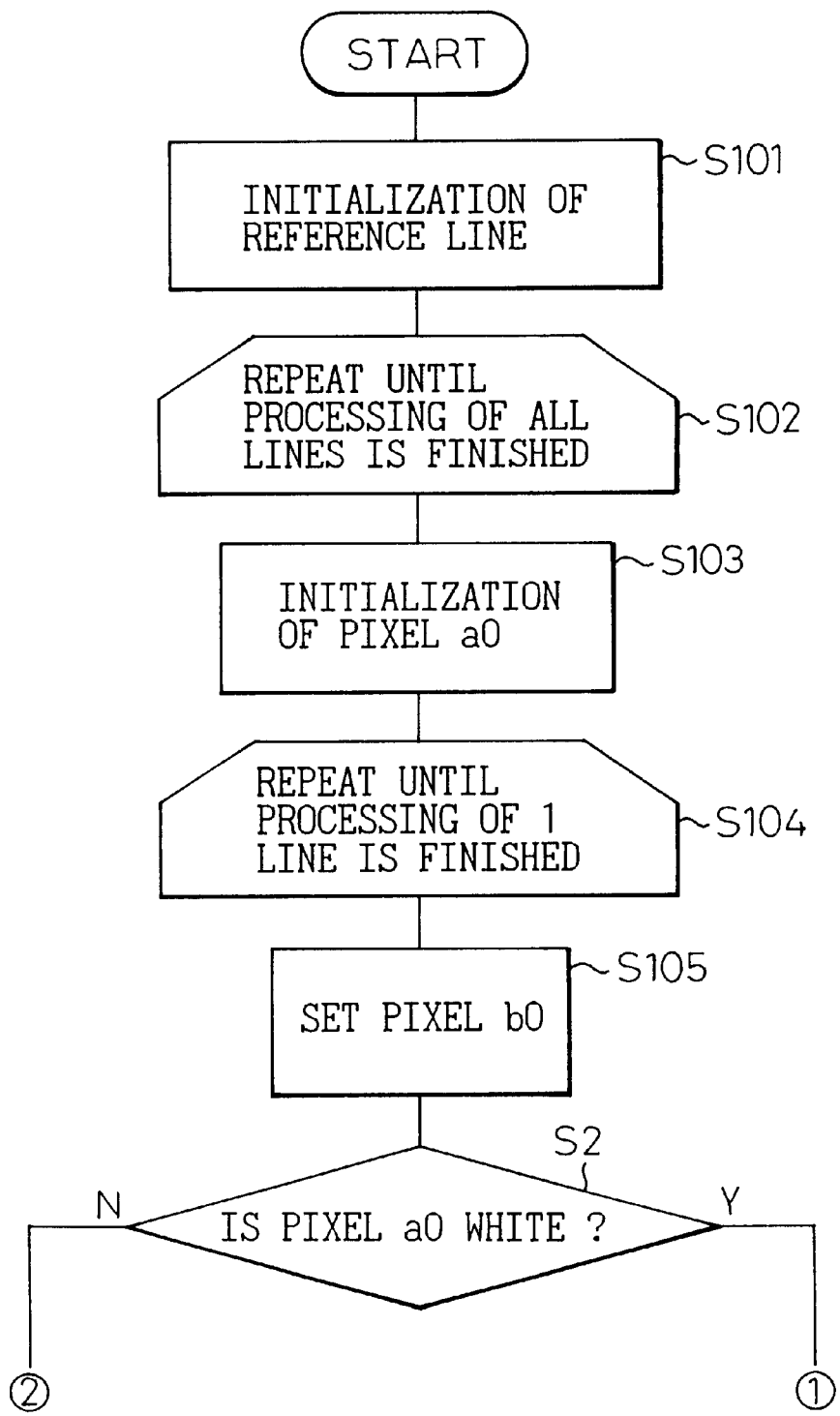
FIG. 9 is a flowchart illustrating the details of step S1 of FIG. 8(A)

Referring first to FIG. 9, there is shown a detailed flow of step S1 of FIG. 8(A). FIG. 9 also illustrates a process flow, which consists of steps S101 to S105, for initializing and setting the starting changing pixel a0 on the coding line and the starting changing pixel b0 on the reference line.

At step S101, the reference line is initialized. In the case that the coding line is the first line, the reference line cannot be set. Therefore, and only in the case of the first line, the coding is performed according to the MH coding scheme. Then, a reference line is set at the time of coding the next line at step S102.

Subsequently, the initialization of the starting changing pixel a0 on the coding line is performed at step S103. Then, the initialization of this pixel a0 is performed repeatedly at step S104 until the processing of 1 pixel line is finished.

When the starting changing pixel a0 on the coding line is determined, a pixel (at the second bit) on the reference line, which is just above the pixel a0, is set as a starting changing pixel b0 on the reference line at step S105.

Incidentally, in the case of processing the beginning of the line, the color of the pixel b0 is set to be white. In other cases, the color of the pixel b0 is determined by searching Table E of FIG. 6. For instance, when the pixel lines are as illustrated in FIG. 7, the bit pattern of 1 byte is "11100000". Therefore, this pattern corresponds to the row "224" of the column "NO." of Table E. Further, the pixel b0 corresponds to the first bit. Thus, as is seen from Table E, the color of the pixel b0 is black.

Subsequently, when the starting changing pixel b0 is set, the process is branched off at step S2 according to whether or not the pixel a0 is white.

In the case of the coding line illustrated in FIG. 7, the pixel a0 is white (Y). Thus, control proceeds to step S3. In the case that the pixel a0 is black (N), control advances to step S11.

At step S3, the process is blanched to two steps, because the procedure for obtaining the position of the changing pixel b1 on the reference line changes according to whether or not the color of the pixel b0 is black.

Figure 10:
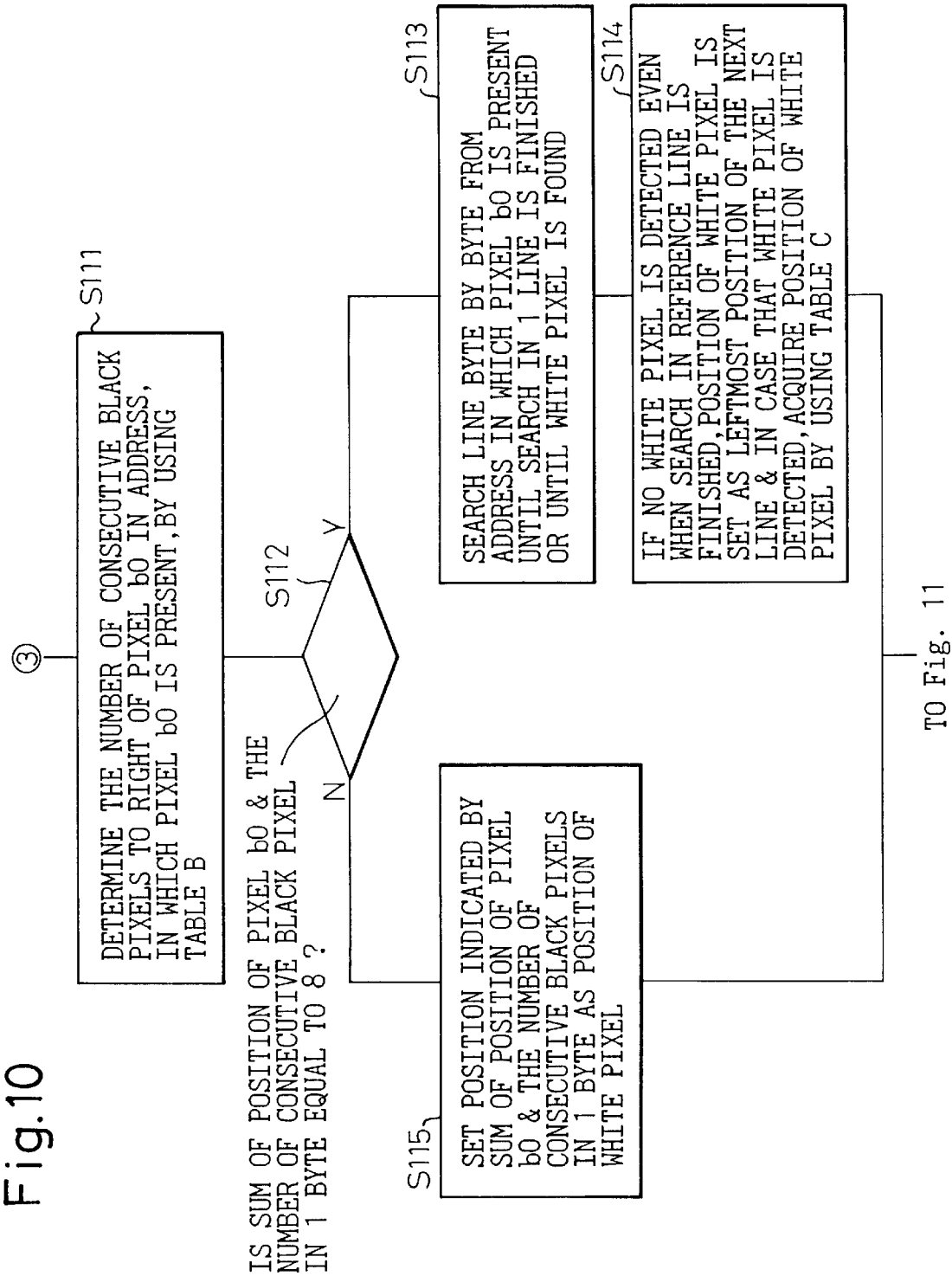
FIG. 10 is a flowchart illustrating the details of step S4 of FIG. 8(A)

The position of the pixel b0 is set at step S105. Then, Table E is searched. As a result, in the case of the reference line illustrated in FIG. 7, it is found that the color of the pixel b0 is black (Y). Thus, control proceeds to step S4. The details of step S4 are illustrated in FIG. 10.

The changing pixel b1 is a first changing pixel that is placed on the reference line and to the right of the pixel a0 and of an opposing color to the color of the pixel a0. Thus, when the starting changing pixel b0 is black as illustrated in FIG. 7, the number of consecutive black pixels to the right of the pixel b0 is obtained. That is, at step S111, the number of consecutive black pixels to the right of the pixel b0 in an address, in which the pixel or bit b0 is present, is obtained according to the bit pattern in a byte, which includes the pixel b0 on the reference line, with reference to Table B illustrated in FIG. 4.

This bit pattern "11100000", corresponds to the row "224" of the column "NO." of Table B. The pixel b0 is placed at the first bit. Thus, from Table B, the number of consecutive black pixels is determined as 1.

Then, it is judged at step S112 to what extent the sequence of consecutive black pixels to the right of the pixel b0 extends. First, the position of the pixel b0 in the first 1 byte is added to the number of consecutive black pixels, which is obtained at step S111, that is, 2+1=3. This resultant number is less than 8 (N). This means that the sequence of consecutive black pixels including the pixel b0 lies within 1 byte, and that there is a sequence of consecutive white pixels in this 1 byte. Therefore, the position (namely, a fourth bit in this case) obtained by adding 1 to the number, which is 3, of consecutive black pixels is set as the position of a white changing pixel at step S115.

Conversely, when the number of consecutive black pixels is 8 (Y) at step S112, this means that all the pixels or bits in 1 byte are black. Therefore, a white pixel is searched for in the pixel line from the address, in which the bit b0 is present, byte by byte at step S113 until the search for a white pixel in 1 line of pixels is completed or until a white pixel is detected.

Thus, in the case that no white pixel is detected even when the search in the reference line is finished, the pixel corresponding to the leading or leftmost bit of the next line is set to be white. Conversely, when a white pixel is detected in 1 byte, the number of consecutive black pixels from the leftmost bit of the byte is obtained from Table C illustrated in FIG. 5 according to the bit pattern of the 1 byte in which the white pixel is detected. Consequently, the number of consecutive black pixels to the right of the pixel b0 is computed. Then, a number is obtained by adding 1 to this computed number of consecutive black pixels. Further, a white pixel at the position indicated at step S114 by the obtained number is set as a white changing pixel.

Figure 11:
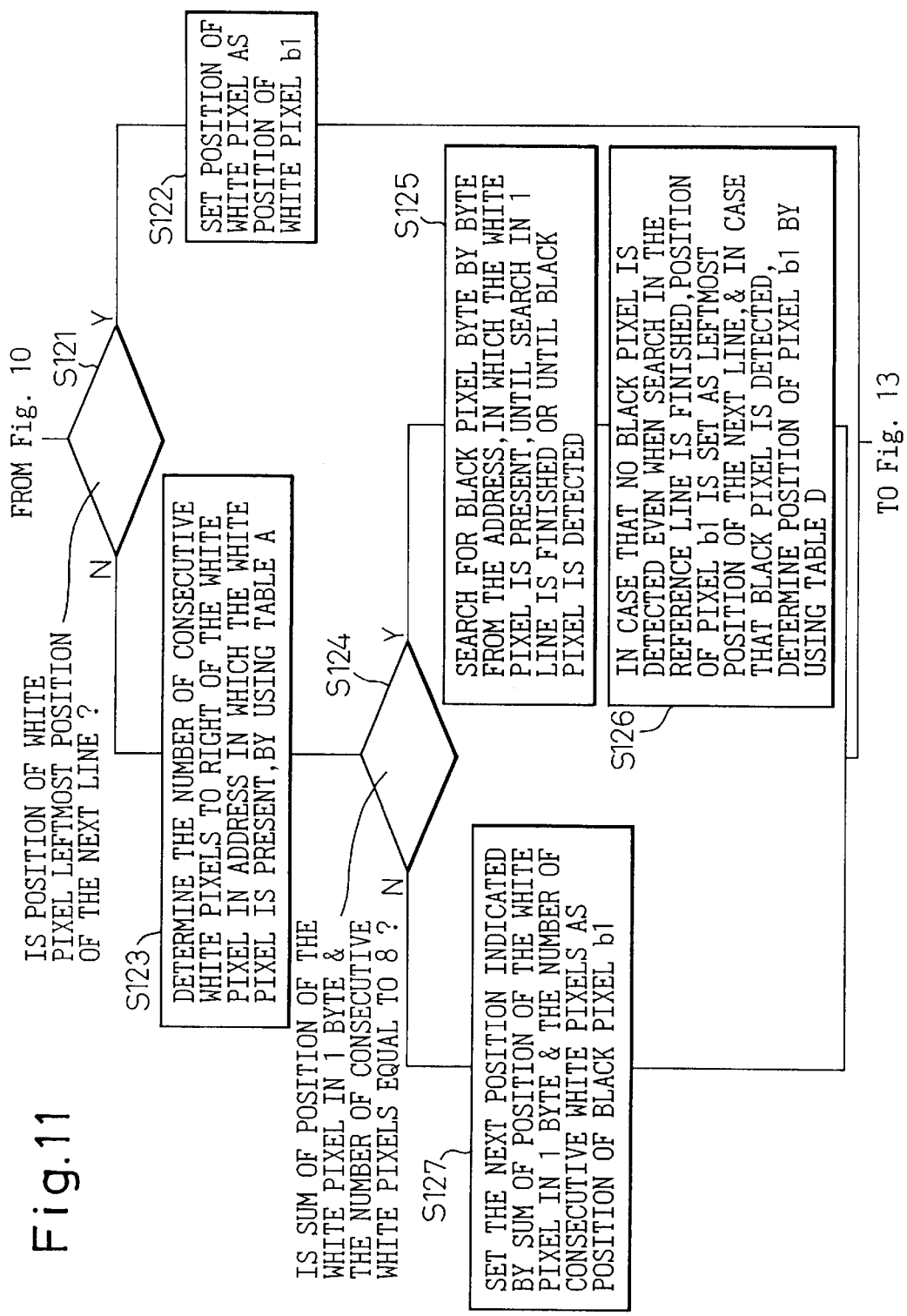
FIG. 11 is a flowchart illustrating the details of step S5 of FIG. 8(A)

Thus, the white changing pixel next to the sequence of consecutive black pixels including the pixel b0 on the reference line is obtained, so that control advances to step S5. FIG. 11 illustrates the detail flow of step S5.

At step S121, it is judged whether or not the white changing pixel obtained as described above is at the leftmost bit of the next line. In the case that this white changing pixel is at the leftmost bit of the next line (Y), the position of this white changing pixel is determined as the position b1 at step S122.

Conversely, when the white changing pixel (at the fourth bit) is not at the leftmost bit of the next line (N) as illustrated in FIG. 7, the number of consecutive white pixels from the next white pixel in an address, in which the next white pixel is present, is obtained at step S123. Then, Table A of FIG. 3 is used according to the bit pattern "11100000". That is, as is seen from the row "224" of the column "3", which corresponds to the third bit, of Table A, the number of consecutive white pixels from the white pixel at the fourth bit in this 1 byte is 4.

Thus, it should be detected to what extent the sequence of consecutive white pixels to the right of the white pixel at the fourth bit extends. At step S124, it is judged whether or not a sum of the position of the white pixel in the 1 byte and the number of consecutive white pixels is 8.

When the sum of the position of the white pixel in the 1 byte and the number of consecutive white pixels is less than 8 (N), this means that a black pixel is detected again in the 1 byte. In this case, the next position indicated by the sum of the position of the white pixel in the 1 byte and the number of consecutive white pixels is set as the position of the black changing pixel b1 at step S127.

In the case that the result of the addition performed at step S124 is 8 (Y), there is a sequence of consecutive white pixels, which extends to the last or least significant bit (the 8th bit) of the 1 byte. Thus, the next 1 byte (from the 9th bit to the 16th bit) is searched for a black pixel at step S125. This search is performed on the pixel line byte by byte until the search in 1 line from the address, in which a white pixel or bit is present, is finished or until a black pixel (at the 23rd bit) is detected.

In the case that no black pixel is detected even when the search in the reference line is finished, the position of the black changing pixel b1 is set as the leftmost position of the next line. However, when a black pixel is detected in the third byte (from the 17th bit to the 24th bit) as illustrated in FIG. 7, the number of consecutive white pixels is obtained by using Table D of FIG. 5. As is seen from the row "3" of Table D according to the bit pattern "00000011", the number of consecutive white pixels is 6. Further, the position indicated by the number obtained by adding 1 to the obtained number of consecutive white pixels is set as the position of the black changing pixel b1 (at the 23rd bit) at step S126.

Figure 12:
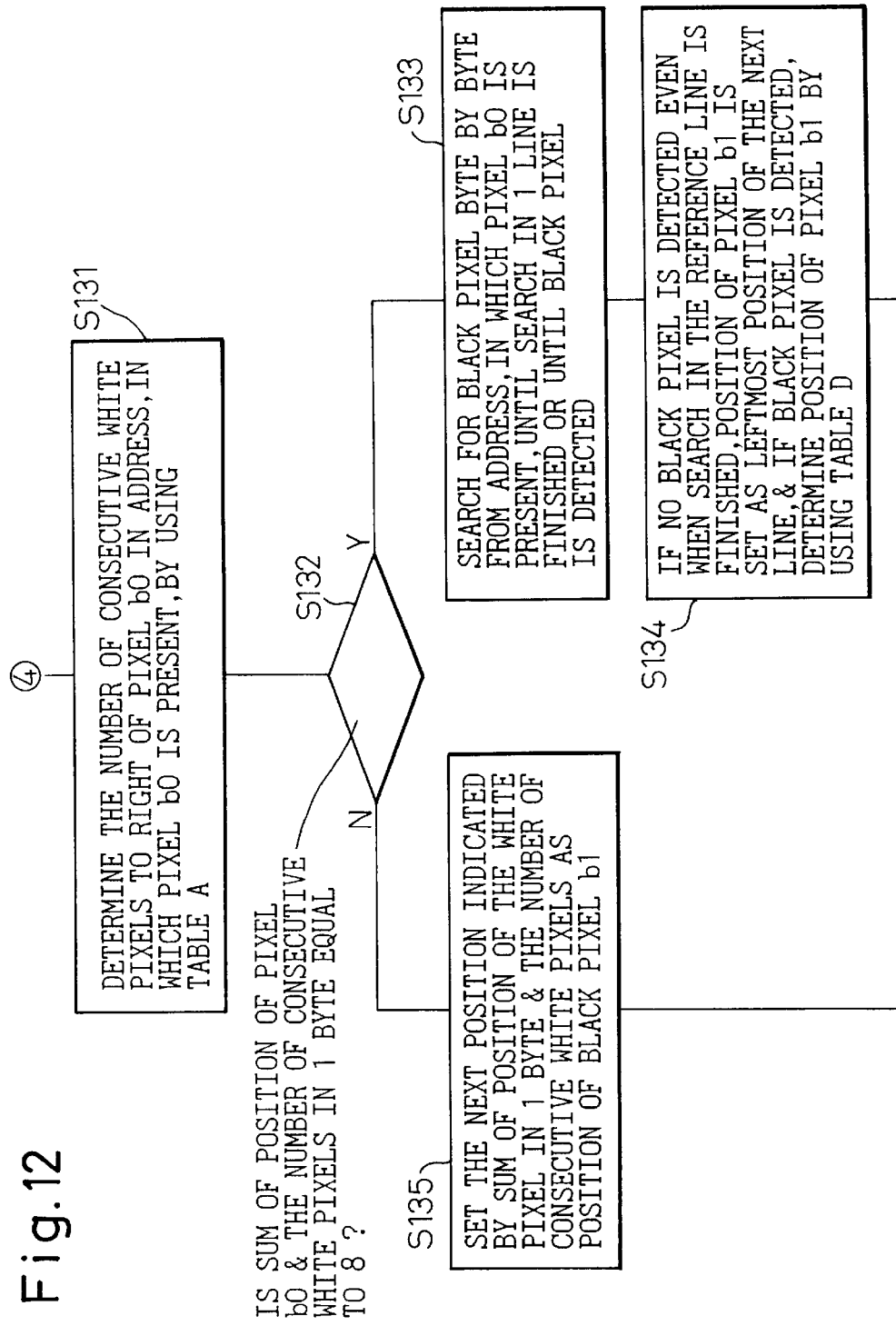
FIG. 12 is a flowchart illustrating the details of step S6 of FIG. 8(A)

Conversely, when it is judged at step S3 that the pixel b0 is not black but white (N), control proceeds to step S6. FIG. 12 illustrates the detail flow of step S6.

The procedure illustrated in the flowchart of FIG. 12 is fundamentally similar to the procedure consisting of steps S111 to S114 of FIG. 10 on condition that the word "black" is read "white" in the description of these steps. Thus, the description of this procedure is omitted. Incidentally, the tables to be referred to are Table B and Table C in the case of the flow illustrated in FIG. 10. However, in the case of the flow illustrated in FIG. 12, the pixel b0 is white, so that the tables to be referred to are changed to Table A and Table D.

Furthermore, in the case of the flow of FIG. 12, the pixel b0 is white. Thus, when the number of consecutive white pixels is obtained, the first black changing pixel to the right of the pixel b0 can be immediately detected. The position indicated by a number, which is obtained by adding 1 to this number of consecutive white pixels, is set as the position of the changing pixel b1 at step S135. Further, even in the case that the number of consecutive white pixels exceeds 8, which is the number of bits of 1 byte, as illustrated in FIG. 7, the position of the pixel b1 can be found at step S134 by adding 1 to a number that is obtained by multiplying 8 by the number of the searched bytes.

Subsequently, at step S5 or S6, the position of the changing pixel b1 is obtained. Then, control advances to step S7, whereupon the position of the changing pixel b2 of the reference line is determined.

Figure 13:
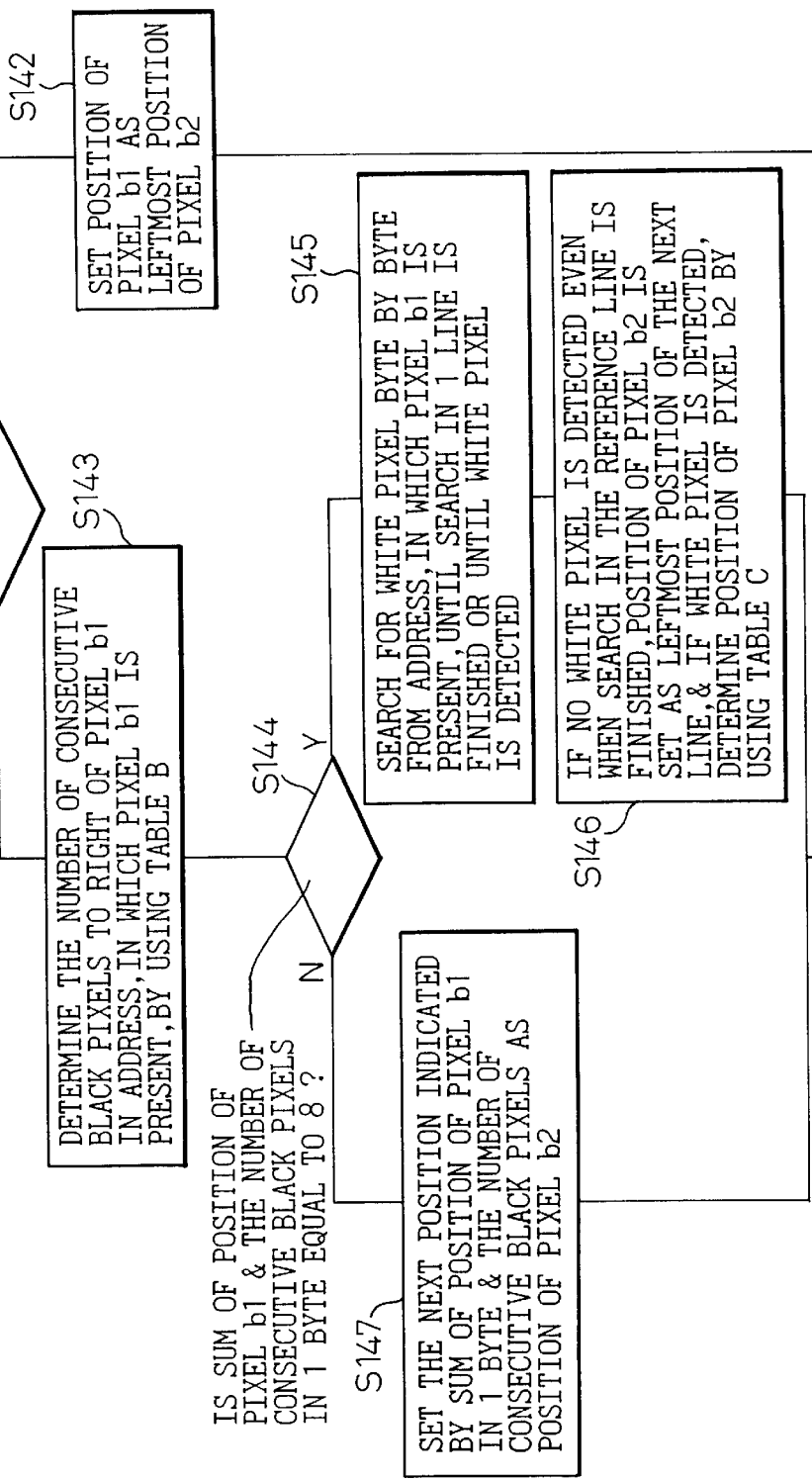
FIG. 13 is a flowchart illustrating the details of step S7 of FIG. 8(B)

FIG. 13 illustrates in detail the flow of step S7. The flow illustrated in FIG. 13 is fundamentally similar to the flow illustrated in FIG. 11. Therefore, the detail description of such a flow is omitted.

Incidentally, the flow illustrated in FIG. 13 can be obtained by reading "the position of a white pixel" as "the position of the pixel b1". Further, Table A and Table D are used in the case illustrated in FIG. 11, while Table B is used at step S143 and Table C is used at step S146 in the case illustrated in FIG. 13. Furthermore, the "pixel b1" at steps S122, S126, and S127 is changed to the "pixel b2" at step S142, S146, and S14.

Thus, the positions of the starting changing pixel b0 on the reference line, and the changing pixels b1 and b2 are obtained. Then, control proceeds to step S8, whereupon the position of the changing pixel a1 on the coding line is obtained.

Figure 14:
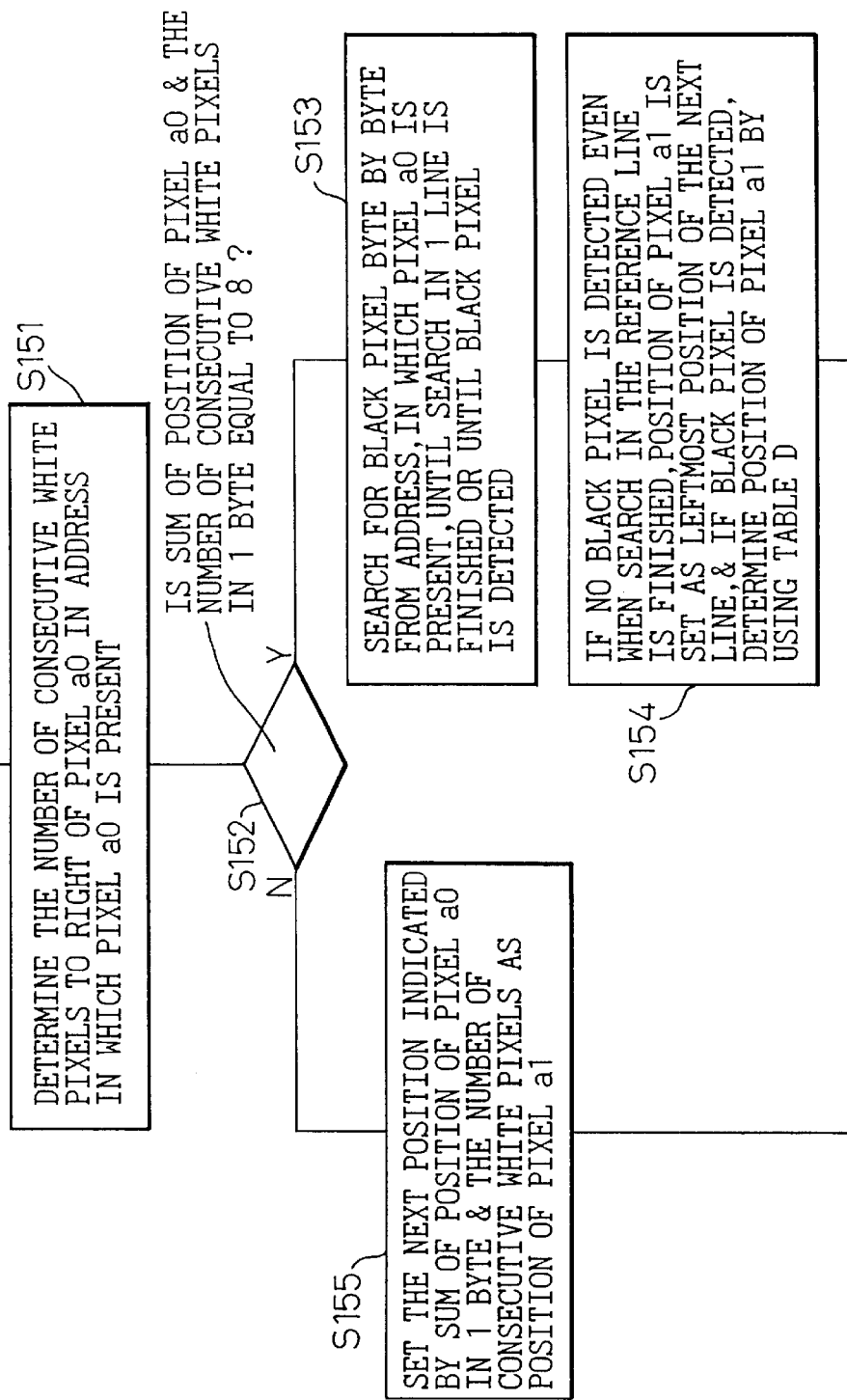
FIG. 14 is a flowchart illustrating the details of step S8 of FIG. 8(B)

FIG. 14 illustrates the detail flow of step S8. However, the flow illustrated in FIG. 14 is fundamentally similar to the flow, illustrated in FIG. 12, for obtaining the position of the pixel b1. Therefore, the detail description of the flow illustrated in FIG. 14 is omitted.

Incidentally, the flow illustrated in FIG. 14 is obtained by reading the characters "b0" and "b1" as "a0" and "a1", respectively, in the flow illustrated in FIG. 12. Further, Table A and Table D are used in the case illustrated in FIG. 12. Similarly, in the case illustrated in FIG. 14, Table A is used at step S151, and Table D is used at step S154.

When the position a1 is obtained from the position a0 at step S8 illustrated in FIG. 14, the positions of all necessary changing pixels for coding are specified. Thus, it is determined which of the pass mode, the vertical mode, and the horizontal mode is selected. Then, control proceeds to step S9.

Figure 15:
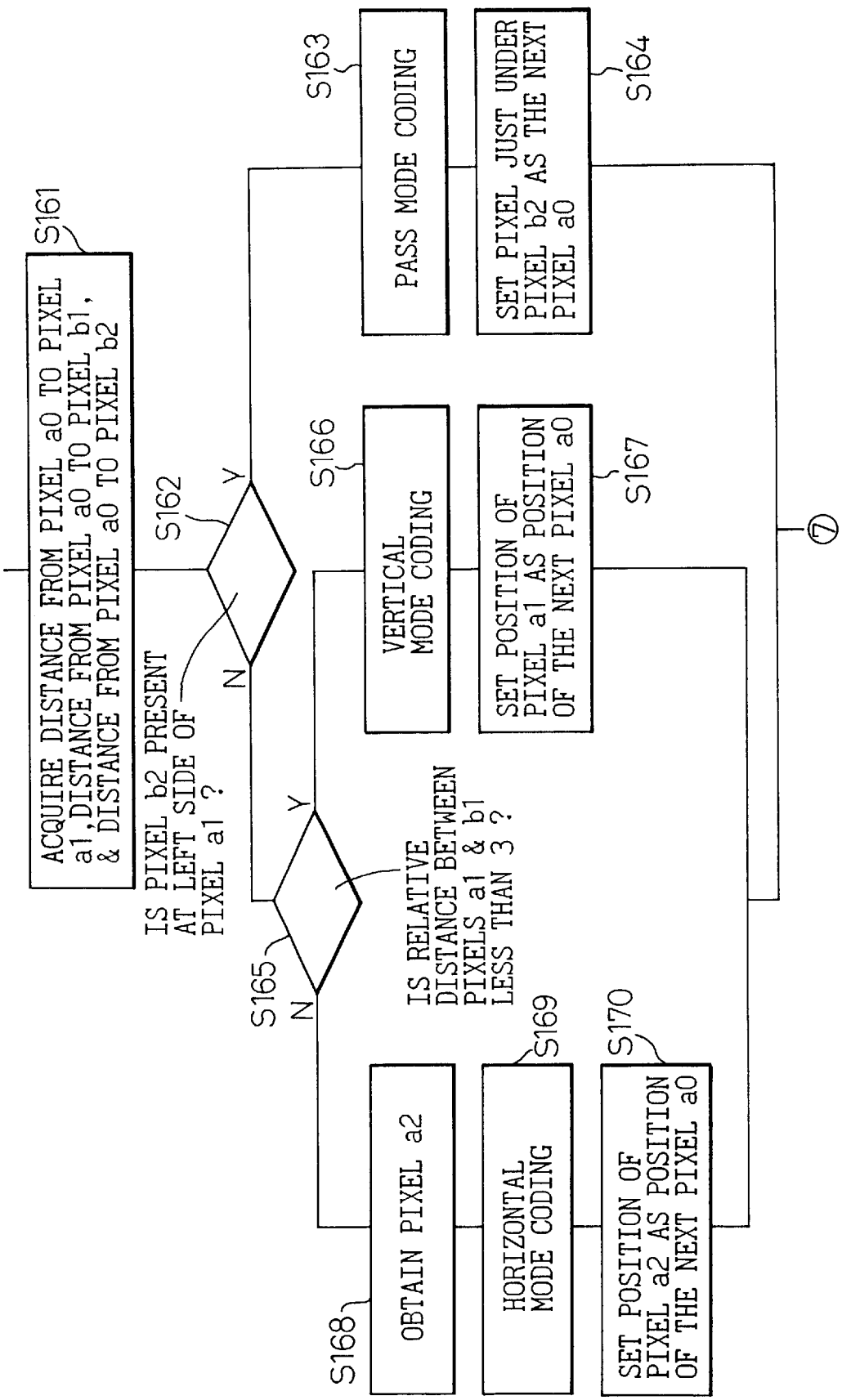
FIG. 15 is a flowchart illustrating the details of step S9 of FIG. 8(B)

FIG. 15 illustrates the detail flow of step S9.

First, the relative distance from the pixel a0 to a1, the relative distance from the pixel a0 to the pixel b1, and the relative distance from the pixel a0 to b2 are obtained at step S161. In the case of the pixel lines illustrated in FIG. 7, the relative distance between the pixels a0 and a1 is 20. The relative distance between the pixels a0 and b1 is 21. The relative distance between the pixels a0 and b2 is 25.

Subsequently, it is judged at step S162 whether or not the pixel b2 is present at the left side of the pixel a1.

Then, in the case that the pixel b2 is present at the left side of the pixel a1 (Y), it is judged that the pass mode is selected, and the pass mode coding is performed at step S163. At that time, a pixel on the coding line, which is present just under the pixel b2, is set as the next starting charging pixel at step S164.

Conversely, in the case that the pixel a1 is present at the left side of the pixel b2 (N), the relative distance between the pixel a1 and the pixel b1. Further, it is judged at step S165 whether or not the relative distance is less than 3.

Thus, in the case that the relative distance between the pixels a1 and b1 as illustrated in FIG. 7, the vertical mode coding is performed at step S166. In the case of the pixel lines illustrated in FIG. 7, the pixel a1 is present at the left side of the pixel b1. A code corresponding to the distance, which is 1, is read from the MR code table. Then, the code "010" is outputted.

Further, the coding of the position of the pixel a1 is finished. Thus, the position of the pixel a1 is set as the position of the next starting pixel a0 at step S167.

In the case that the relative distance between the pixels a1 and b1 exceeds 3 (N) at step S165, the position of the first changing pixel a2, which is to the right of the pixel a1, should be determined. To determine the position of the pixel a2, it is sufficient to perform steps similar to those of the detail flow, which are illustrated in FIG. 12. Incidentally, there is the necessity for replacing the pixels b0 and b1 with the pixels a1 and a2, respectively. Tables to be referred to depends upon which of white and black the color of the pixel a1 is. When the pixel a1 is white, Table A and Table B are used. Conversely, when the pixel a1 is black, Table B and Table C are used for determining the position of the pixel a2.

When the relative distance between the pixels a1 and b1 exceeds 3, the horizontal mode is selected. Further, the horizontal mode coding is performed at step S169. A horizontal mode code "001" is read from the MR code table. Further, a code corresponding to the relative distance therebetween is read from the MH code table, and added thereto.

Then, upon completion of coding, the position of the pixel a2 is set as the position of the next starting changing pixel a0 at step S170.

Thus, the positions of the changing pixels a0, a1, a2, b0, b1 and b2 are determined. Upon completion of coding, the next starting changing pixel a0 is sequentially set. Then, a bit string of 1 byte including this starting changing pixel a0 is read. Subsequently, control advances to step S10. FIG. 15 illustrates the detail flow of step S10. At step S171, control returns to step S104 of FIG. 9 until the coding of the positions of the entire one coding line is completed.

Further, upon completion of coding of 1 line, the current coding line is set as the next reference line, and the line next to the current coding line is set as the next coding line at step S172.

Moreover, at step S173, control returns to step S102 of FIG. 9 and repeats the aforementioned process until the aforementioned processing of all pixel lines to be coded is completed. Upon completion of compression processing of all the pixel lines, the process is finished.

Incidentally, in the foregoing description, the compression processing employing the MMR coding scheme has been described. However, even in the case of performing the compression processing employing other coding schemes, for example, an MH coding scheme, similarly as in the case of this embodiment, an pixel string is divided into bytes, and Table A to Table E are referred to according to the bit pattern of each of the bytes, and the number of consecutive pixels of the same color from each bit, and compression processing can be by computing the positions of the changing pixels and the distance therebetween.

As described above, according to this embodiment, to acquire the positions of the starting changing pixel b0, the changing pixels b1, and b2 on the reference line, and the changing pixels a1 and a2 on the coding line, a bit string of each line is divided into bytes. Then, the number of consecutive pixels of the same color in a byte corresponding to the bit pattern is obtained. Thus, as compared with the procedure for processing the positions of the changing pixels by shifting the position of the changing pixels bit by bit, the processing time can be considerably decreased. Furthermore, the process flow can be changed according to the color of the starting changing pixel a0. Thus, the processing time can be reduced still further.

Therefore, according to the present invention, the positions of the changing pixels on the coding line and the reference line in each byte can be sequentially processed. Consequently, a high speed compression processing can be realized.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. A data compression processing method comprising the steps of:

producing a bit string corresponding to pixel data obtained from an image and sequentially fetching data byte by byte from the bit string;

detecting the number of consecutive bits that are arranged to the right of and have a same color as each of bits of each fetched byte;

determining a pixel placed at a position corresponding to a number obtained by adding 1 to the detected number of consecutive bits, as a color changing pixel, and thus obtaining a position of each changing pixel in each of the sequentially fetched bytes; and coding the image data according to the position of each of the changing pixels.

2. The data compression processing method according to claim 1, which further comprises the steps of:

searching a table describing the number of consecutive bits that are arranged to the right of and have a same color as each of bits of each byte of all bit patterns represented by bits included in 1 byte; and detecting the number of consecutive bits that are arranged to the right of and have a same color as each of bits of each of the fetched bytes according to the bit patterns represented by bits of each of the fetched bytes.

3. The data compression processing method according to claim 2, which further comprises the steps of:

setting a reference line and a coding line according to said bit string, and producing a bit string of each of the reference line and the coding line;

sequentially fetching data byte by byte from each of the reference line and the coding line;

obtaining positions of changing pixels in each of the reference line and the coding line; and performing MMR coding by computing a distance between the changing pixels.

4. The data compression processing method according to claim 3, wherein a position of a bit, which is present in 1 byte fetched from the reference line, corresponding to a position of a starting changing pixel, which is present in 1 byte fetched from the coding line, is determined as a position of a starting changing pixel on the reference line.

5. A data compression processor comprising:

an input buffer, to which pixel data of an image is inputted, for producing and holding a bit string;

a lookup table unit for storing at least a table that describes the number of bits, which are arranged to the right of and have a same color as each of bits of each byte of all bit patterns represented by bits included in 1 byte; and a compression processing unit for fetching a bit string of image data from said input buffer, wherein said compression processing unit reads the pixel data from said input buffer byte by byte, and performs compression processing by obtaining a position of a changing pixel according to the number of bits of a same color as that of each of bits detected from said table according to bit patterns that are represented by bits included in the read byte.

6. The data compression processor according to claim 5, wherein said compression processing unit is operative to set a reference line and a coding line according to said bit string, and to produce a bit string of each of the reference line and the coding line, and to sequentially fetch data byte by byte from each of the reference line and the coding line, and to obtain positions of changing pixels in each of the reference line and the coding line, and to perform MMR coding by computing a distance between the changing pixels.

* * * * *